US012299857B2

(12) United States Patent
Shtylenko et al.

(10) Patent No.: US 12,299,857 B2
(45) Date of Patent: May 13, 2025

(54) APPARATUSES, COMPUTER-IMPLEMENTED METHODS, AND COMPUTER PROGRAM PRODUCTS FOR IMPROVED GENERATION OF OBJECT IDENTIFICATION DATA

(71) Applicant: Honeywell International Inc., Charlotte, NC (US)

(72) Inventors: Andrey Shtylenko, McKinney, TX (US); Andy Walker Brown, Richardson, TX (US); Adam Dewey McBrady, Dallas, TX (US); Ratna Dinakar Tumuluri, Alpharetta, GA (US)

(73) Assignee: Honeywell International Inc., Charlotte, NC (US)

( * ) Notice: Subject to any disclaimer, the term of this patent is extended or adjusted under 35 U.S.C. 154(b) by 484 days.

(21) Appl. No.: 17/813,953

(22) Filed: Jul. 21, 2022

(65) Prior Publication Data
US 2023/0030191 A1 Feb. 2, 2023

Related U.S. Application Data

(60) Provisional application No. 63/226,525, filed on Jul. 28, 2021.

(51) Int. Cl.
*G06T 5/73* (2024.01)
*G06T 5/50* (2006.01)
*G06V 10/774* (2022.01)

(52) U.S. Cl.
CPC .............. *G06T 5/73* (2024.01); *G06T 5/50* (2013.01); *G06V 10/774* (2022.01); *G06T 2207/10056* (2013.01); *G06T 2207/10148* (2013.01)

(58) Field of Classification Search
None
See application file for complete search history.

(56) References Cited

U.S. PATENT DOCUMENTS

| 11,054,357 | B2 | 7/2021 | Ozcan et al. |
| 2012/0218379 | A1* | 8/2012 | Ozcan ..................... G03H 1/06 348/40 |
| 2019/0234853 | A1* | 8/2019 | Ruffner ................ G03H 1/0866 |

OTHER PUBLICATIONS

European search report Mailed on Apr. 18, 2023 for EP Application No. 22186865, 4 page(s).

(Continued)

*Primary Examiner* — Dov Popovici
(74) *Attorney, Agent, or Firm* — Alston & Bird LLP

(57) ABSTRACT

Embodiments of the present disclosure provide for improved generation and outputting of object identification data indicating object classifications for object representations. Such objects representations may correspond to depictions of objects in images captured using digital holographic microscopy. Some embodiments generate object identification data by comparing object representations in focused image(s) with specially configured annotated focused images, for example using a specially trained neural network or other machine learning model trained based on such annotated focused images. The annotated focused images are generated including a plurality of channels, each associated with a different grayscale focused image at a different target focal length of a range of target focal lengths. In this regard, model(s), algorithm(s), and/or other specially configured implementations may learn the spatial features of particular object representations and associated object identification data. The trained models may be used to perform accurate comparisons with the annotated focused images.

20 Claims, 14 Drawing Sheets

(56) References Cited

OTHER PUBLICATIONS

European search report and search opinion Mailed on Apr. 5, 2024 for EP Application No. 23210069, 8 page(s).

* cited by examiner

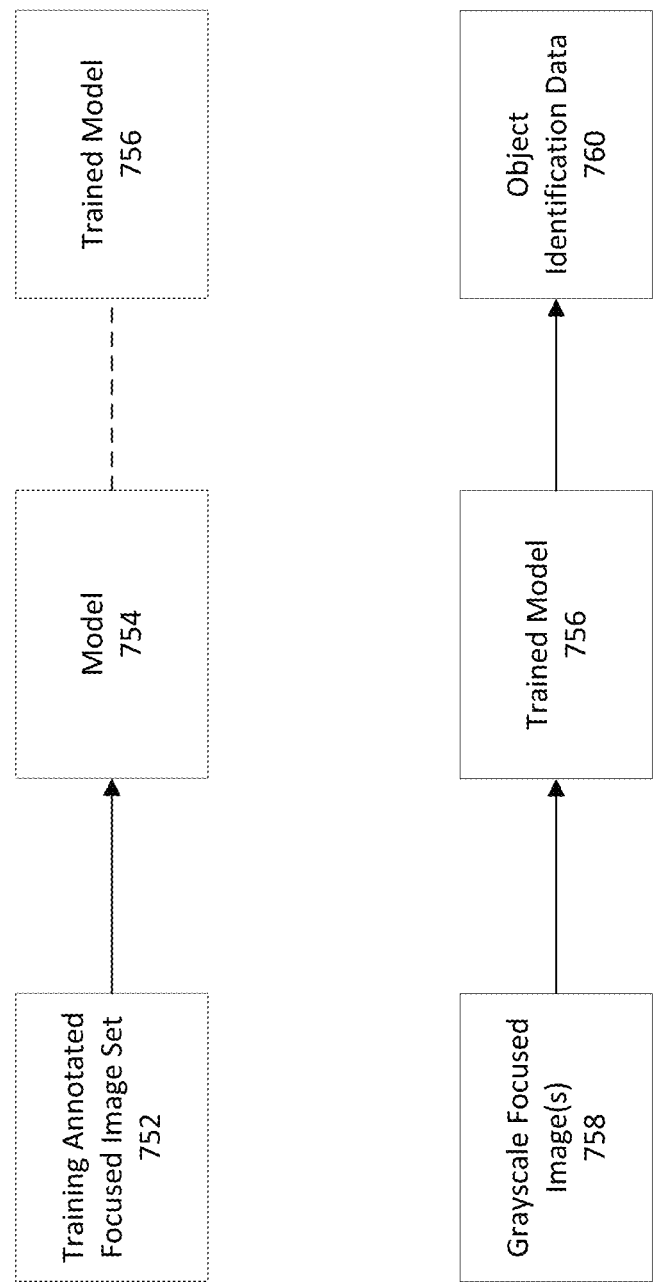

APPARATUSES, COMPUTER-IMPLEMENTED METHODS, AND COMPUTER PROGRAM PRODUCTS FOR IMPROVED GENERATION OF OBJECT IDENTIFICATION DATA

CROSS REFERENCE TO RELATED APPLICATION

This application claims priority to Provisional Application No. 63/226,525, filed Jul. 28, 2021, the content of which is incorporated herein by reference in its entirety.

TECHNOLOGICAL FIELD

Embodiments of the present disclosure generally relate to image processing for purposes of object identification, and specifically to improved generation of object identification data that identifies small object representations within a captured hologram utilizing multi-channel grayscale image annotating and processing.

BACKGROUND

In various contexts, classifying or identifying various depicted elements within an image can be an important task. In one or more of such contexts, the depicted elements may be of varying size, with certain elements being large or depicted as large and other elements being small or depicted as small. In the context of air particulate analysis, for example, certain particulates may be captured in an image as large (e.g., dust mite particles) while other particulates may be captured in an image as small (e.g., mold spores). All such particulates are often intended and/or important to be classified and/or identified. Applicant has discovered problems with current implementations for accurately classifying and/or otherwise identifying object(s) within a captured image, especially when particularly small (e.g., below 10 microns) object representations are depicted. Through applied effort, ingenuity, and innovation, Applicant has solved many of these identified problems by developing embodied in the present disclosure, which are described in detail below.

BRIEF SUMMARY

In general, embodiments of the present disclosure provided herein provide improved generation of object classifications and/or identifications. Other implementations for improved generation of object classifications and/or identifications will be, or will become, apparent to one with skill in the art upon examination of the following figures and detailed description. It is intended that all such additional implementations be included within this description be within the scope of the disclosure, and be protected by the following claims.

In accordance with a first aspect of the present disclosure, a computer-implemented method is provided. The computer-implemented method provides for improved generation and output of object identification data. The computer-implemented method is executable via any of a myriad of computing devices embodied in hardware, software, firmware, and/or any combination thereof, as described herein. In one example embodiment of the computer-implemented method, the example computer-implemented method includes generating a grayscale focused image set corresponding to a raw digital holographic microscopy image comprising at least one captured object representation, each grayscale focused image in the grayscale focused image set focused at a different target focal length of a range of target focal lengths. The example computer-implemented method further includes generating at least one object identification data by comparing the grayscale focused image set to a plurality of annotated focused images associated with a training raw digital holographic microscopy image, where each of the plurality of annotated focused images comprising a plurality of channels. In the example computer-implemented method, the plurality of channels for each annotated focused image of the plurality of annotated focused images includes (1) a middle channel comprising a first grayscale focused image corresponding to a first target focal length of the range of target focal lengths, the first target focal length at which a selected object representation within at least the training raw digital holographic microscopy image is determined via a selection algorithm, (2) a shorter channel comprising a second grayscale focused image corresponding to a second target focal length of the range of target focal lengths, where the second target focal length is shorter than the first target focal length, and (3) a longer channel comprising a third grayscale focused image corresponding to a third target focal length of the range of target focal lengths, where the third target focal length is longer than the first target focal length. Additionally, in the example computer-implemented method, each particular annotated focused image of the plurality of annotated focused images is associated with annotation data that identifies one or more object representations in each channel of the particular annotated focused image. The example computer-implemented method further includes outputting the at least one object identification data.

Additionally or alternatively, in some embodiments of the example computer-implemented method, generating the focused image set includes applying a spectral propagation algorithm to the raw digital holographic microscopy image over the range of target focal lengths.

Additionally or alternatively, in some embodiments of the example computer-implemented method, generating the at least one object identification data includes applying the grayscale focused image set to a model trained based on the plurality of annotated focused images associated with at least the training raw digital holographic microscopy image.

Additionally or alternatively, in some embodiments of the example computer-implemented method, the example computer-implemented method further includes training the model based at least in part on the plurality of annotated focused images.

Additionally or alternatively, in some embodiments of the example computer-implemented method, the computer-implemented method further includes generating the plurality of annotated focused images by: receiving a set of training grayscale focused images; for each particular object representation of a set of object representations in the training raw digital holographic microscopy image, (a) generating a focused image by: (i) assigning the middle channel of the focused image to a first training grayscale focused image of the set of training grayscale focused images corresponding to a determined first target focal length for the particular object representation of the range of target focal lengths, the determined first target focal length at which the particular object representation within at least the training raw digital holographic microscopy image is determined via a selection algorithm; (ii) assigning the shorter channel of the focused image to a second training grayscale focused image of the set of training grayscale focused images corresponding to a determined second target focal length for the particular object representation, the determined second target focal length based at least in part on an offset from the determined first target focal length for the particular object representation in a first direction; and (iii) assigning the longer channel of the focused image to a third training grayscale focused image of the set of training grayscale focused images corresponding to a determined third target focal length for the particular object representation, the determined third target focal length based at least in part on the offset from the determined first target focal length for the particular object representation in a second direction; and (b) associating the focused image with particular annotation data for the particular object representation.

Additionally or alternatively, in some such embodiments of the example computer-implemented method, the particular annotation data for the particular object representation indicates a boundary of the particular object representation within the focused image.

Additionally or alternatively, in some embodiments of the example computer-implemented method, the computer-implemented method further includes generating, from the plurality of annotated focused images, a test subset of annotated focused images, a training subset of annotated focused images, and a validation subset of annotated focused images, where the model is trained based at least in part on the test subset of the annotated focused images, the training subset of the annotated focused images, and the validation subset of the annotated focused images.

Additionally or alternatively, in some embodiments of the example computer-implemented method, the plurality of channels comprises a red channel, a green channel, and a blue channel. Additionally or alternatively, in some such embodiments of the example computer-implemented method, the green channel corresponds to the middle channel for each of the plurality of annotated grayscale focused images.

Additionally or alternatively, in some embodiments of the example computer-implemented method, the computer-implemented method further includes receiving the raw digital holographic microscopy image captured via a sample capture apparatus.

Additionally or alternatively, in some embodiments of the example computer-implemented method, the range of target focal lengths represent a predefined range of target focal lengths at which object representations are determined likely to be depicted in focus.

In accordance with a second aspect of the present disclosure, a system is provided. In one example embodiment, the example system includes one or more processors and at least a memory including computer program code stored thereon. The computer program code, in execution with the at least one processor, causes the system to perform the steps of any one of the example computer-implemented methods described herein.

In accordance with a third aspect of the present disclosure, a non-transitory computer-readable storage medium embodying a computer program product is provided. In one example embodiment, the non-transitory computer-readable storage medium includes computer program code for execution by one or more processors of a device. The computer program code, when executed by the one or more processors, cause the device to perform the steps of any one of the example computer-implemented method described herein.

BRIEF SUMMARY OF THE DRAWINGS

Figure 1:
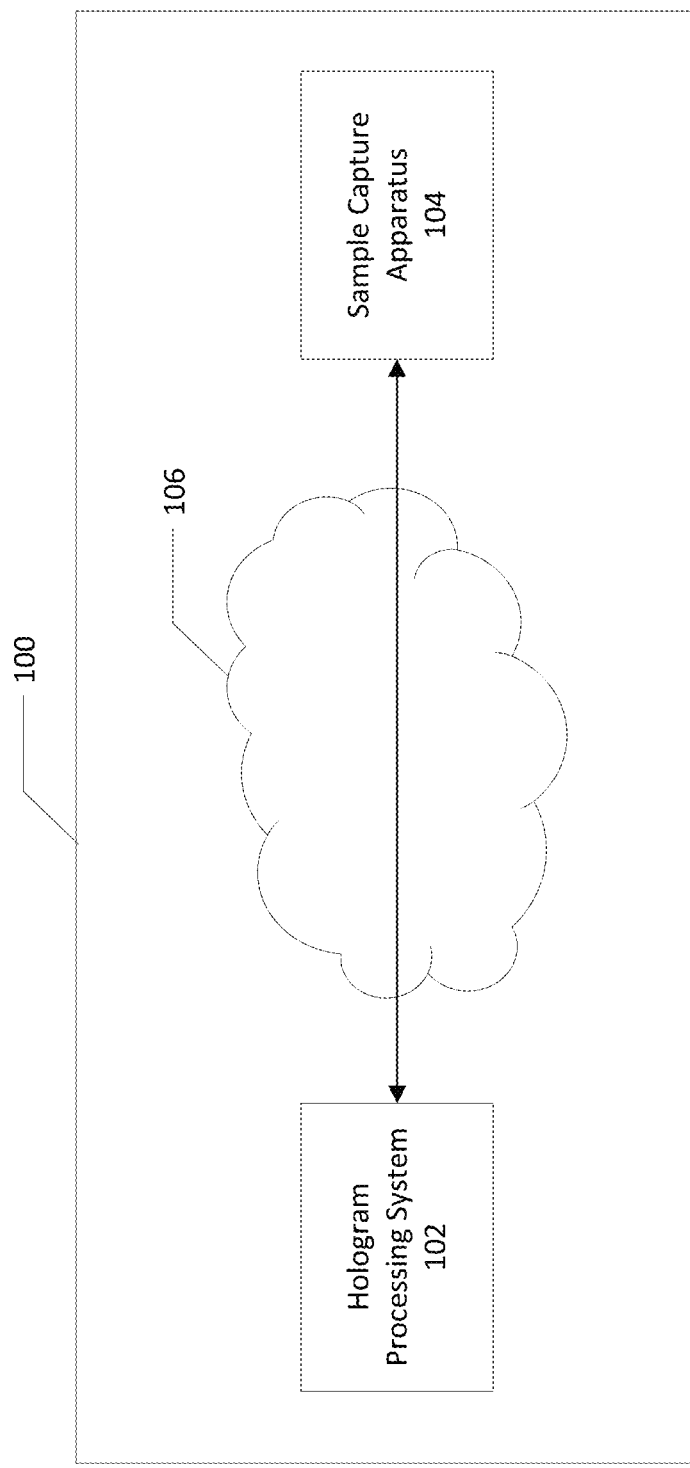
Figure 2:
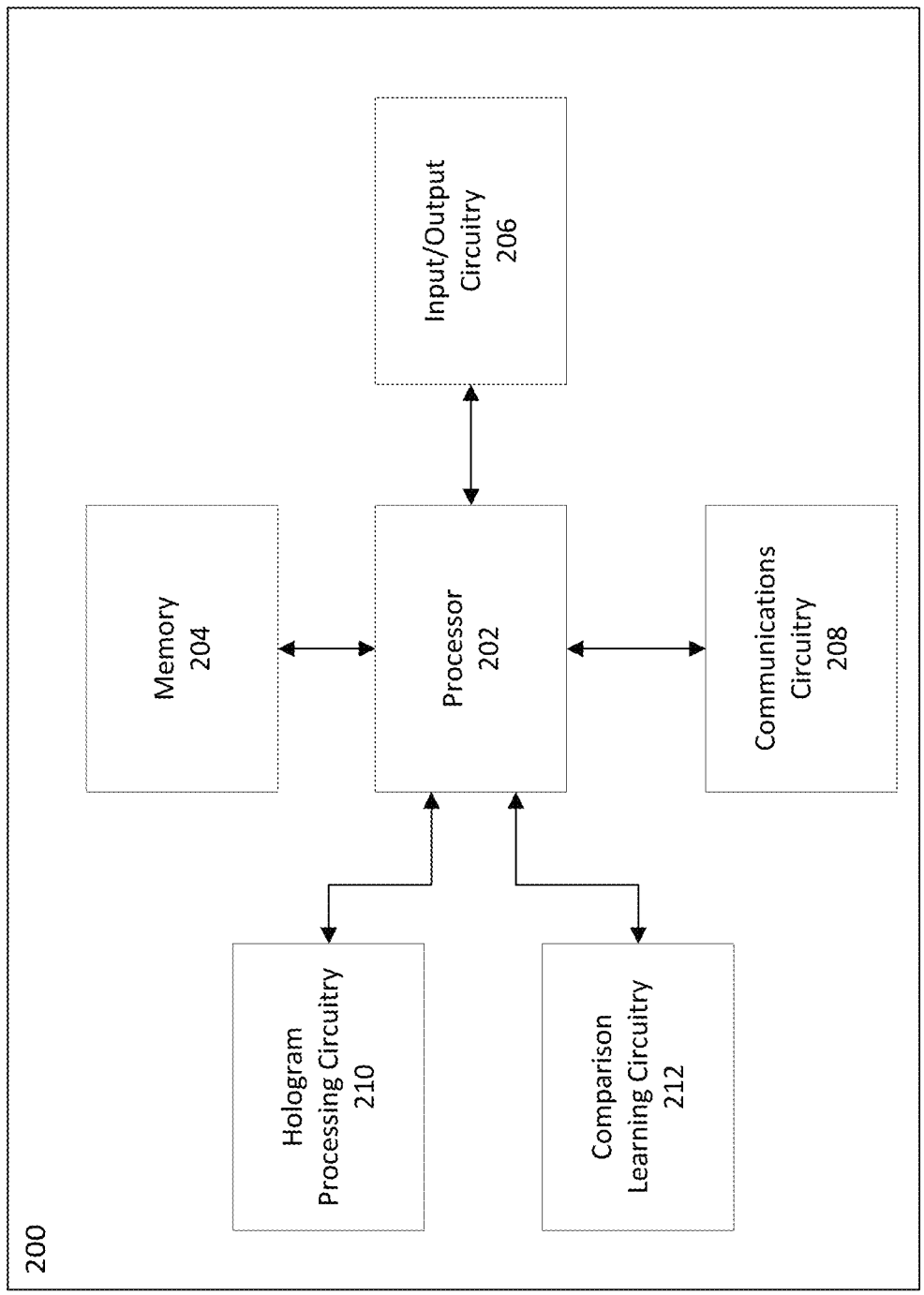
Figure 3:
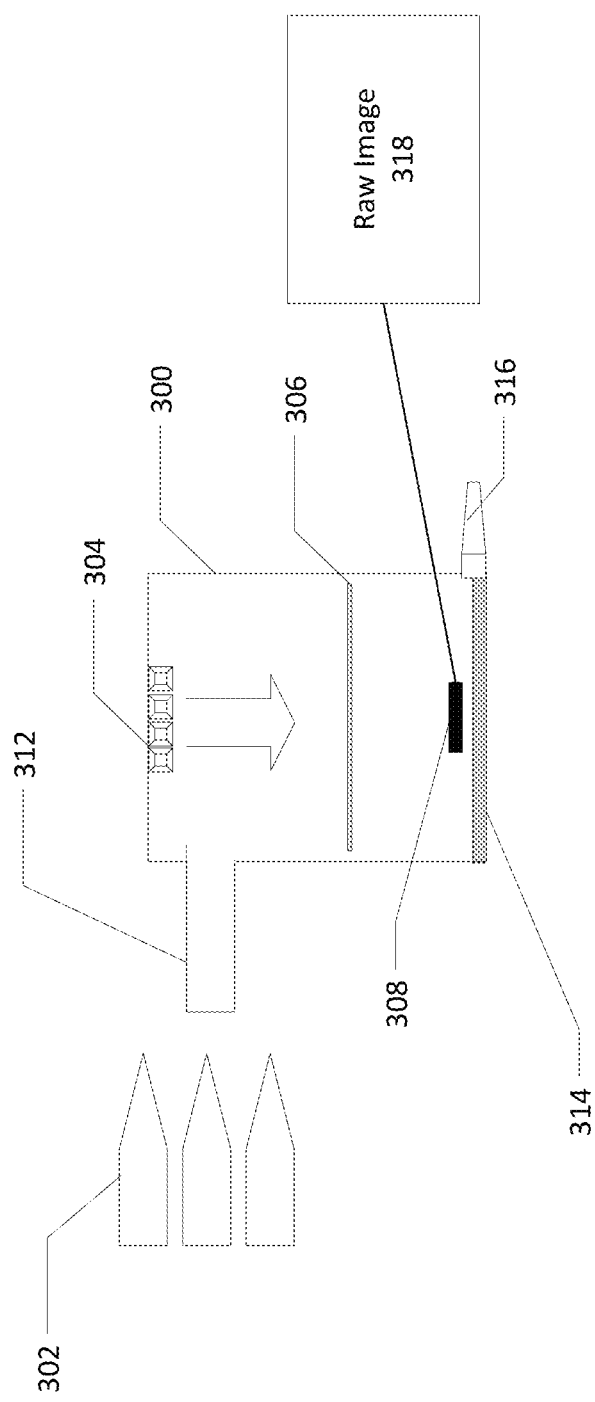
Figure 4:
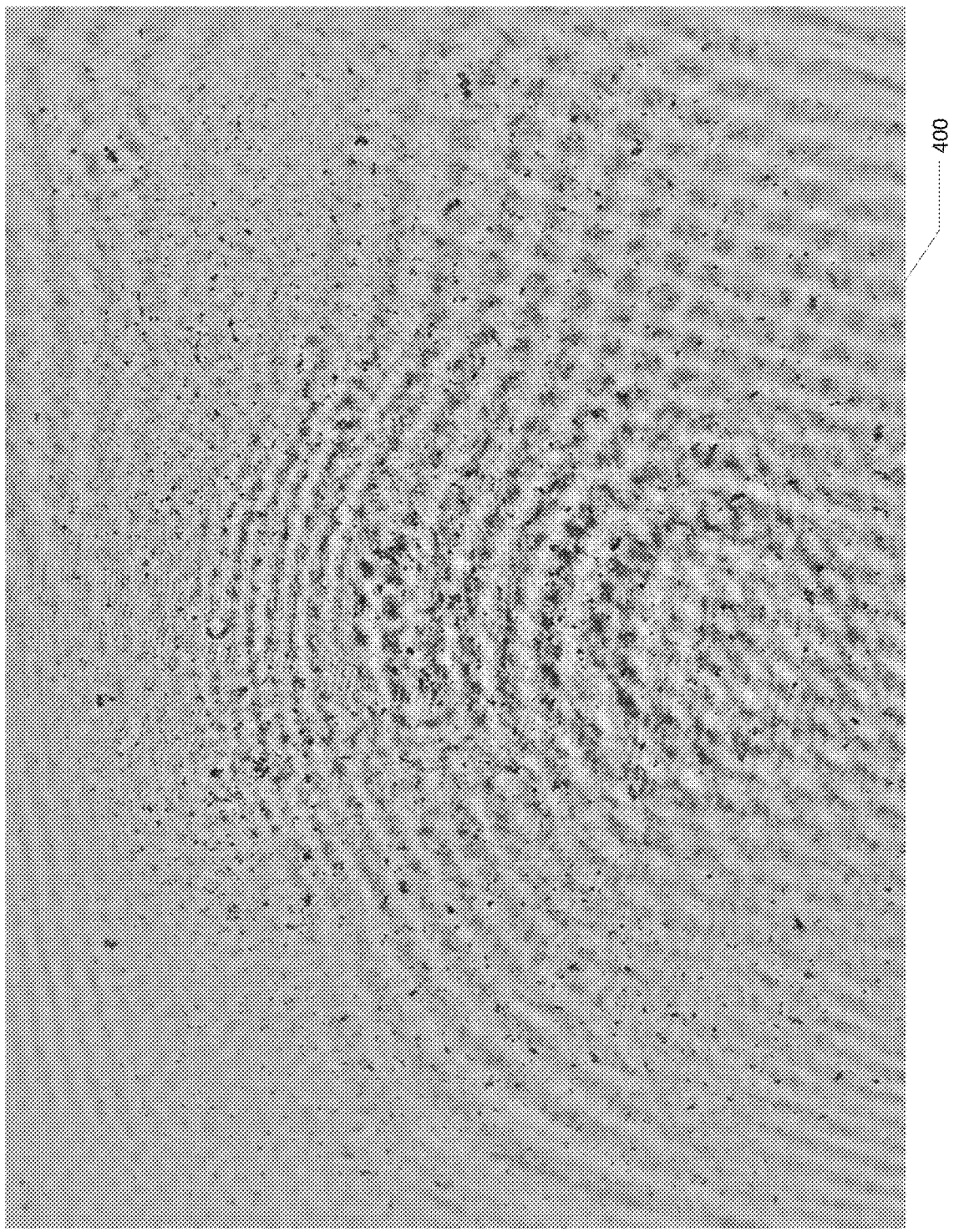
Figure 5:
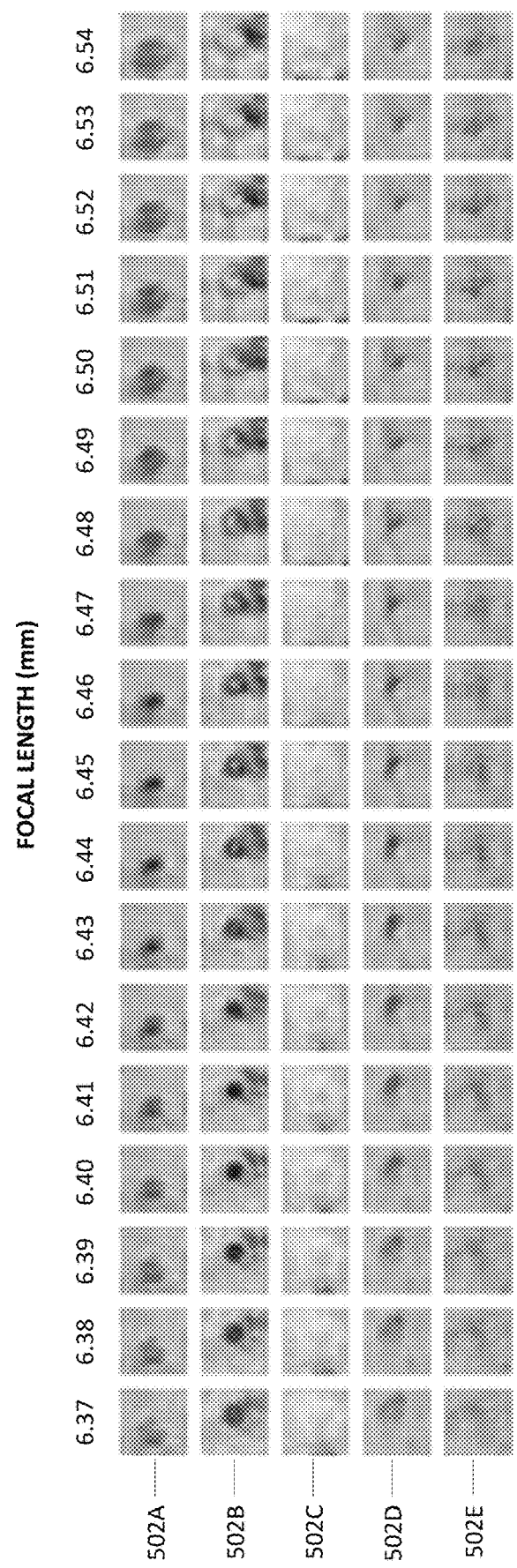
Figure 6A:
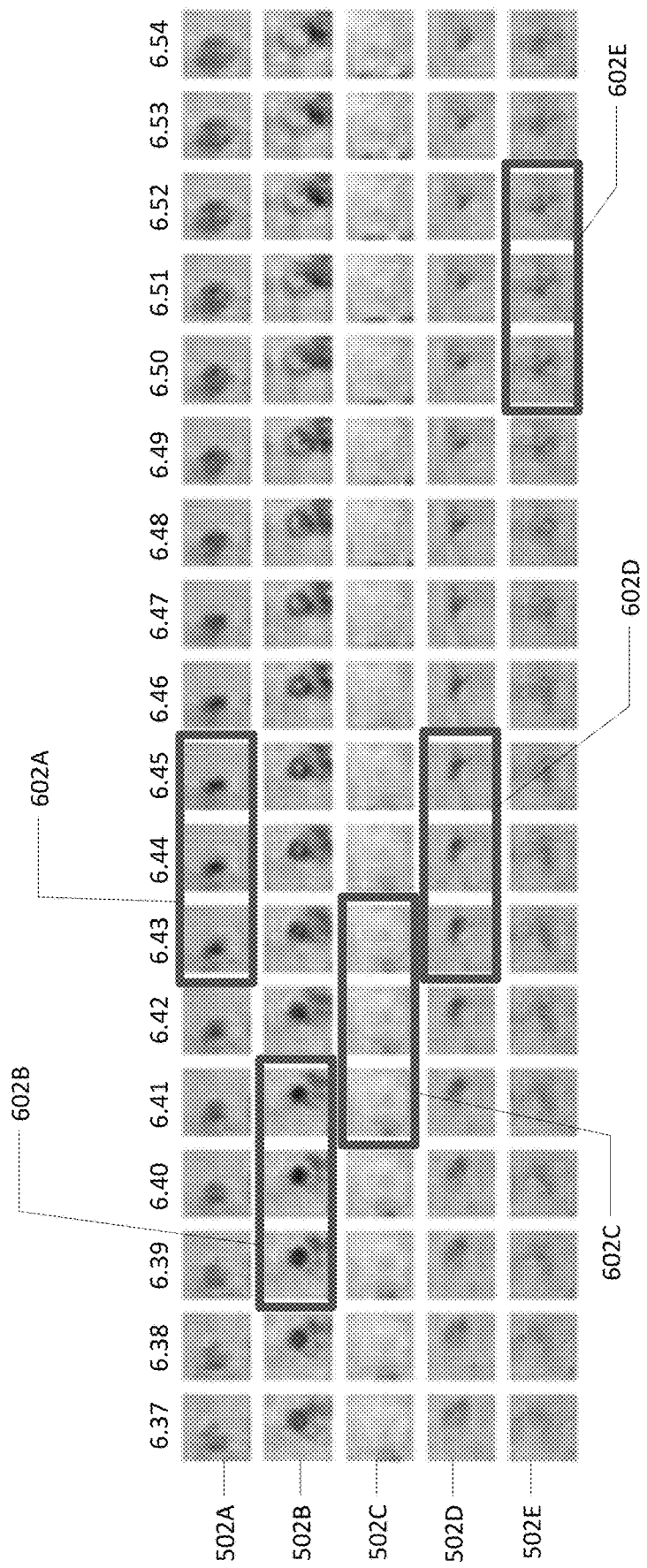
Figure 6B:
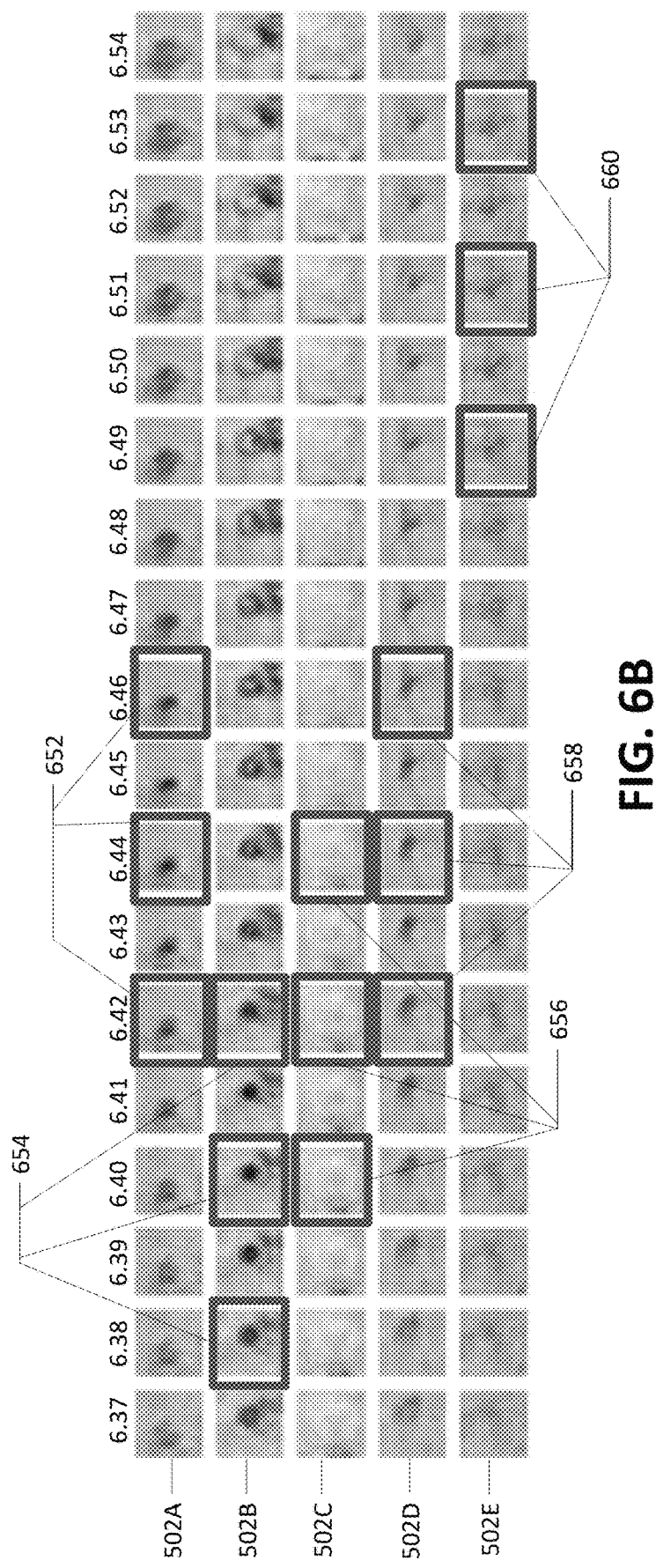
Figure 8:
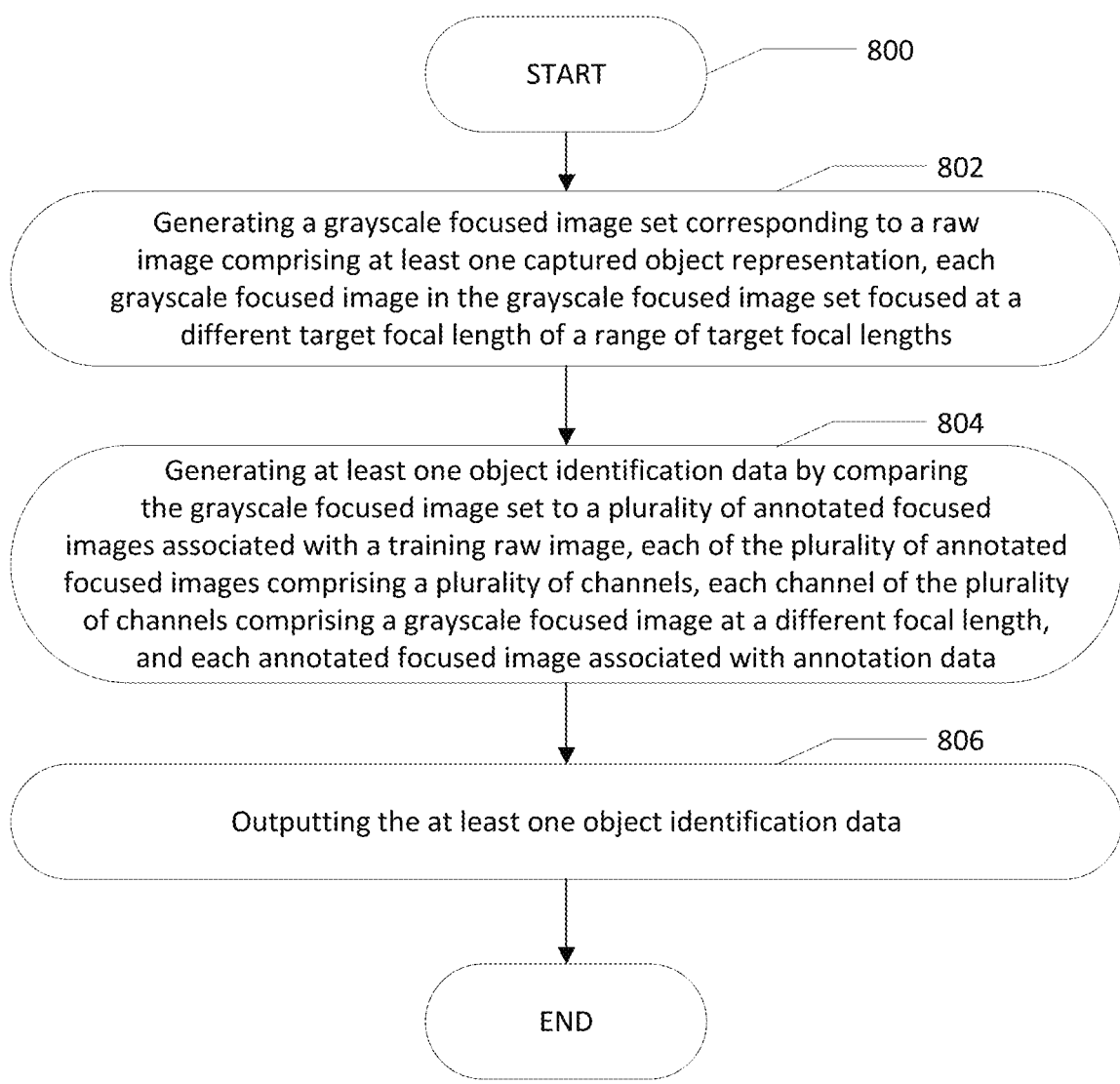
Figure 9:
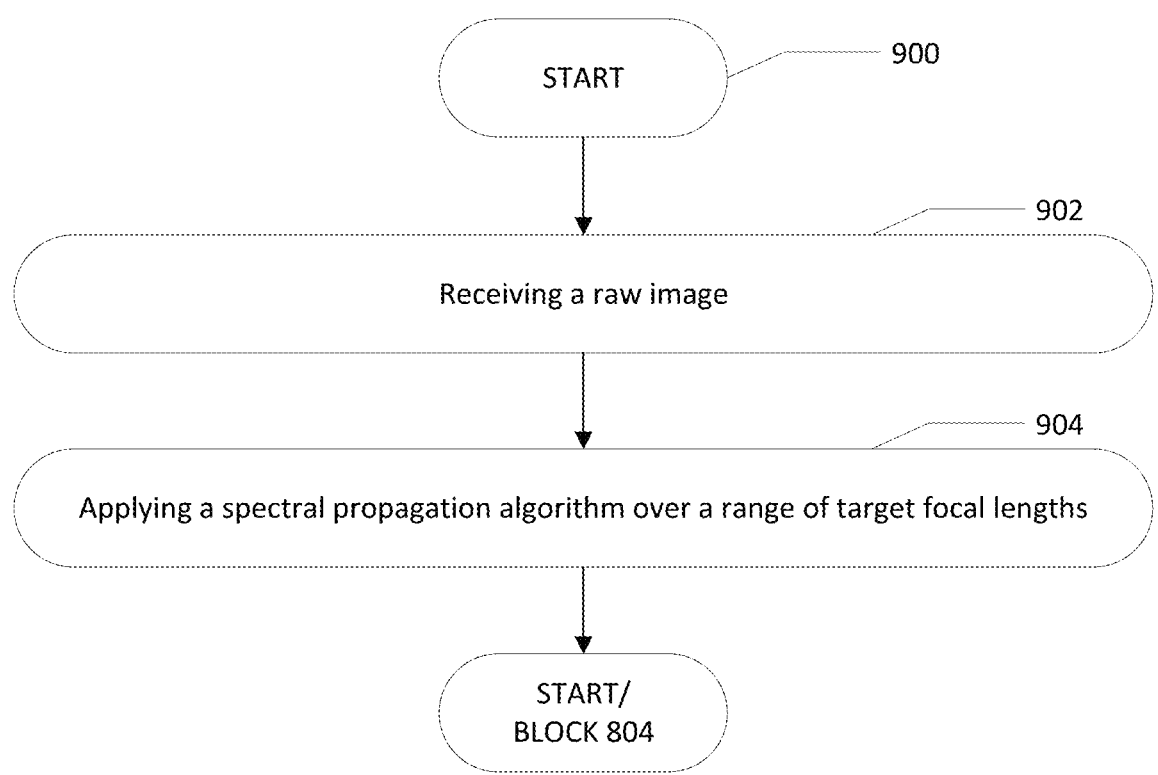
Figure 10:
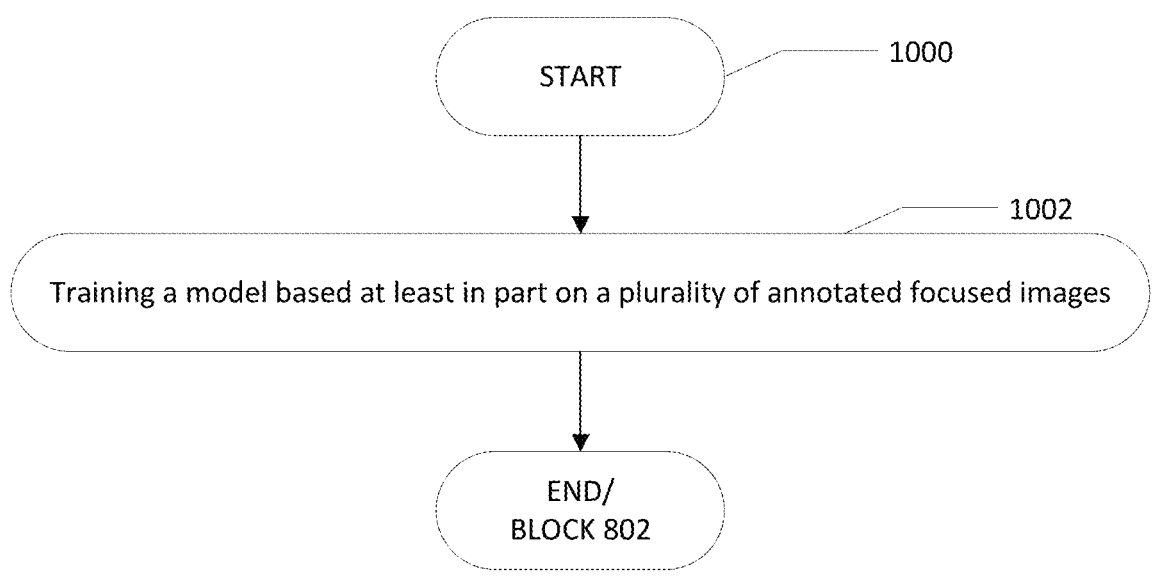
Figure 11:
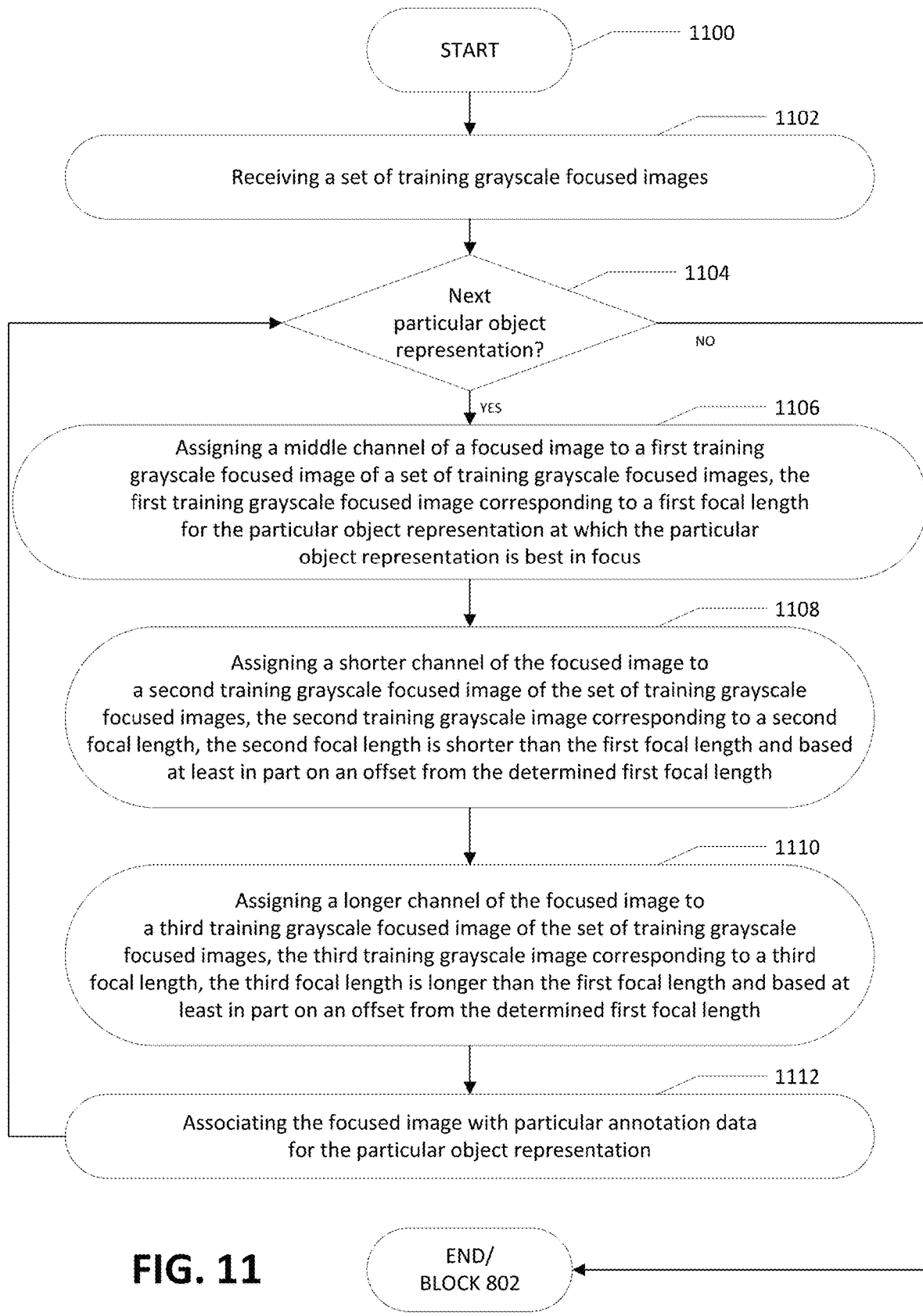
Figure 12:
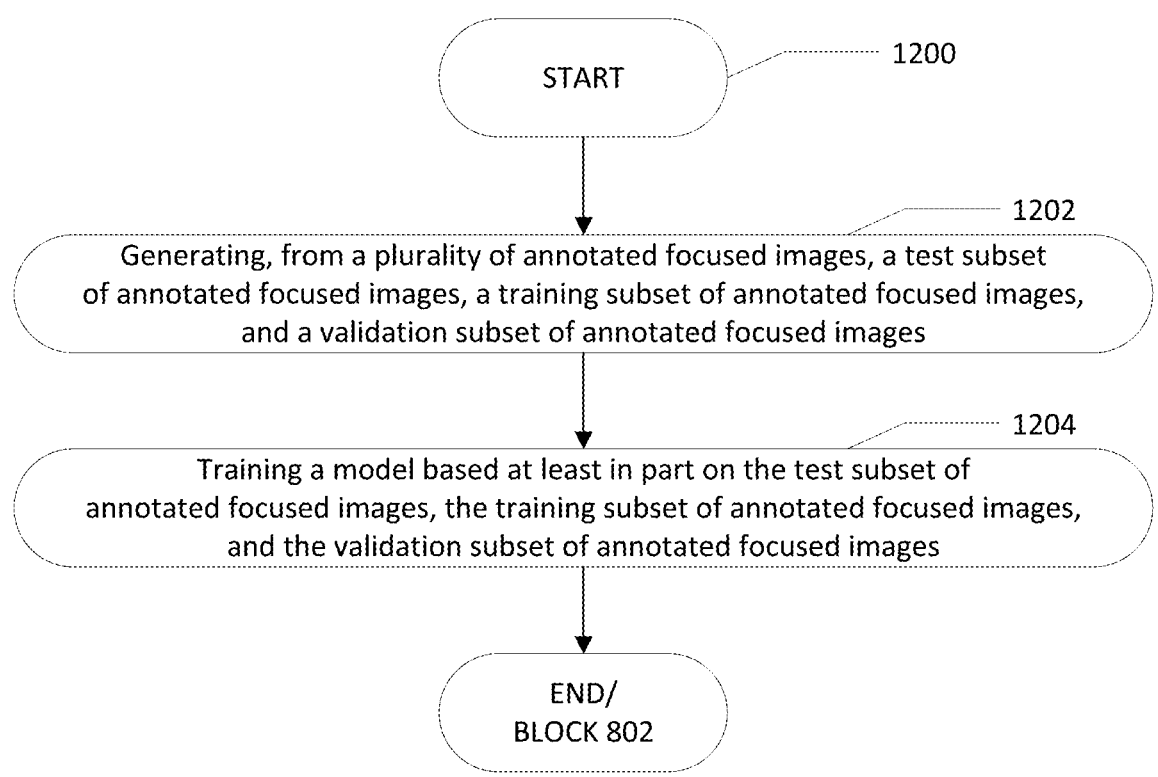
Figure 13:
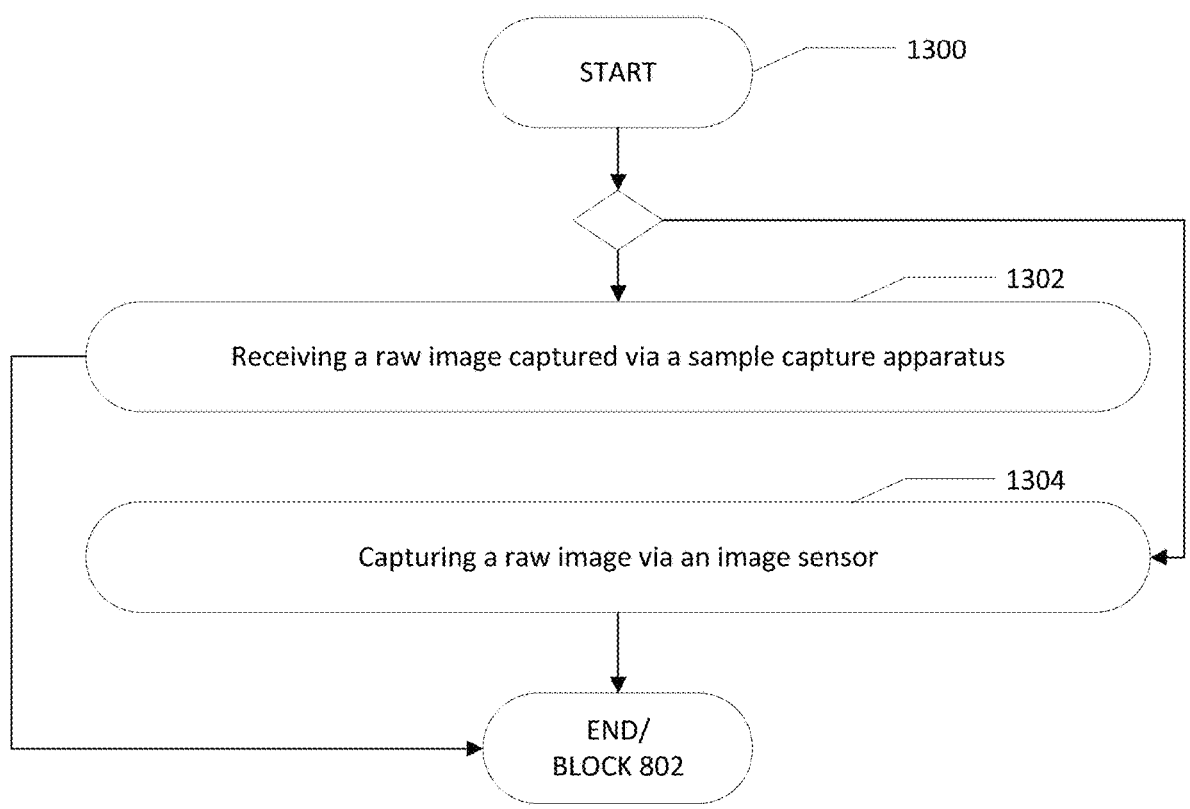

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example hologram imagery processing apparatus that may be specially configured in accordance with at least some example embodiments of the present disclosure;

FIG. 3 illustrates a visualization of sample intake and raw digital holographic microscopy image capture in accordance with at least some example embodiments of the present disclosure;

FIG. 4 illustrates an example grayscale focused image including various object representations generated from a raw digital holographic microscopy image captured in accordance with at least some example embodiments of the present disclosure;

FIG. 5 illustrates example object representations within grayscale focused images at various target focal lengths in accordance with at least some example embodiments of the present disclosure;

FIG. 6A illustrates an example construction of example focused images including sequential focused grayscale images in a plurality of channels in accordance with at least some example embodiments of the present disclosure;

FIG. 6B illustrates another example construction of example focused images including focused grayscale images in a plurality of channels based on a particular offset from a particular target focal length in accordance with at least some example embodiments of the present disclosure;

FIG. 7 illustrates an example representation of specialized model training and deployment in accordance with at least some example embodiments of the present disclosure;

FIG. 8 illustrates a flowchart depicting example operations of an example process for generating improved object identification for object representation(s) in a raw digital holographic microscopy image in accordance with at least some example embodiments of the present disclosure;

FIG. 9 illustrates a flowchart depicting example operations of an example process for generating a grayscale focused image set in accordance with at least some example embodiments of the present disclosure;

FIG. 10 illustrates a flowchart depicting example operations of an example process for training a model based at least in part on a plurality of annotated focused images in accordance with at least some example embodiments of the present disclosure;

FIG. 11 illustrates a flowchart depicting example operations of an example process for generating one or more annotated focused image in accordance with at least some example embodiments of the present disclosure;

FIG. 12 illustrates a flowchart depicting example operations of an example process for training a model based on training, test, and validation subsets of annotated focused images in accordance with at least some example embodiments of the present disclosure; and FIG. 13 illustrates a flowchart depicting example operations of retrieving a raw digital holographic microscopy image in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Embodiments of the present disclosure utilize specially configured implementations of holographic microscopy and corresponding image processing to improve the identification of particular object representations in reconstructed holographic images from a particular captured raw digital holographic microscopy image. Such embodiments generate and/or otherwise output object identification data that more accurately identifies such object representations within each of the reconstructed holographic images. In this regard, such advantages may be utilized in various fields. In one example context, embodiments of the present disclosure provide such advantages within the field of sample processing, such as air sample processing and/or other fluid sample processing. For example, an air sampling device may intake a sample of air from an environment and capture objects in the air sample (e.g., in a capture medium, such as a specially coated film) for purposes of identifying such objects. The air sampling device may capture a raw digital holographic microscopy image of the captured objects, and initiate processing of the raw digital holographic microscopy image for determining such identities. Accurately identifying the captured objects is often important towards a desired goal in processing the ample (e.g., air or otherwise), for example determining particulate types, quantities, concentrations, and/or the like, and/or derived determines such as whether a particular object is in the sample, determining whether all objects in the sample are safe, determining whether the sample passes a particular test, severity of objects within the sample, and/or the like. Reconstructing (e.g., "focusing") hologram images alone provides various advantages towards identifying such objects, but still suffers from various technical problems, such as in identifying a classification of particularly small objects represented in the captured raw digital holographic microscopy image. It should be appreciated that in other contexts, such as analyzing objects within a fluid sample, the means for capturing the raw digital holographic microscopy image of the sample may change, and the raw digital holographic microscopy image may be processed utilizing the focused image generation and processing methodologies described herein.

Embodiments of the present disclosure utilize particular implementations that compare generated grayscale focused images and particular annotated focused images having a plurality of channels. The generated grayscale focused images may simulate a raw digital holographic microscopy image at varying target focal lengths within a particular range of target focal lengths, such that each grayscale focused image provides a slightly different representation of a particular object based on the simulated change in target focal length (e.g., based on a particular desired delta between target focal lengths). In this regard, such images may be compared to annotated focused images that are particularly annotated at target focal lengths where objects are determined via a selection algorithm. For example, the annotated focused images may include a particular number of channels (e.g., red, green, and blue channels), with the middle channel including an annotated image representing a first target focal length where a particular object representation is determined via a selection algorithm, and the surrounding channels including annotated images representing shorter and longer target focal lengths, respectively, from the first target focal length. Each annotated image may include or otherwise be associated with annotation data that indicates the relevant area of the image corresponding to an object representation and/or object identification data that indicates the classification, type, and/or other identity for that object representation. In this regard, the features of object representations for a particular object class represented in the annotated focused image may be learned from such annotated focused images at particular focus lengths where such object representations may most accurately be identified.

In some embodiments, a model (e.g., a machine learning model, statistical, and/or algorithmic model) is specially configured to learn such features of object representations based on the annotated focused images as training data. In this regard, the model may learn the features of object representations at particular target focal lengths (e.g., determined via a selection algorithm, for example selection where such object representations are best in focus) to improve the accuracy of resulting object identifications. Once trained, the model thus performs the comparison between newly inputted grayscale focused images and the annotated focused images to determine which object identification data (e.g., a classification or type of object) each object representation in the grayscale focused images best corresponds to. For example, in some embodiments, the model includes or is embodied by a trained neural network that learns the features of various object representations, each corresponding to a particular object classification represented by particular object identification data, from the annotated focused images. The trained neural network thus performs pattern matching on object representations within the newly inputted images to determine which object classifications the object representations correspond to, for example based on the learned features of such object classifications during training, and outputs the object identification data accordingly.

Embodiment of the present disclosure provide various technical improvements to various technical fields. For example, in some embodiments, annotated focused images include a plurality of channels, each channel assigned a particular focused image corresponding to a particular target focal length. In this regard, a model trained on such annotated focused images (or other comparison mechanism) learns to identify and classify object representations based on the features of such object representations particularly at such target focal lengths. The annotated focused images may thus be compared to the object representations at target focal lengths where the features of the object representation are at particular focuses, for example determined via a selection algorithm, such as where the object representation is best in focus, thus reducing the likelihood of inaccurate identifications resulting from such comparisons. Additionally or alternatively, by utilizing multiple channels, features of an object representation at various target focal lengths may be learned from a single annotated focused image, thus further improving the accuracy of such comparisons. Additionally or alternatively still, some embodiments utilize particular algorithms and/or mechanisms (e.g., spectral propagation algorithm(s)), or the like) to generate a plurality of grayscale focused images simulating a plurality of target focal lengths to enable operation of such embodiments as described herein without changes to the underlying hardware, software, and/or firmware configuration of an imager utilized to capture raw digital holographic microscopy images of a particular sample. In this regard, embodiments of the present disclosure may be retrofit to improve the operations of existing sample capture apparatuses without additional configuration of such devices, and/or in other contexts may be deployed as a software and/or firmware update to corresponding device(s) and/or system(s) regardless of the underlying hardware configuration of each sample capture apparatus itself.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "set" refers to one or more data structures that store any number of data objects of a particular shared type, or of multiple shared types. A "set" may be preceded or succeeded by the type of data object stored within the one or more data structures. For example, an "image set" and "set of images" refer to data structures storing any number of image data objects.

The term "sample capture apparatus" refers to one or more computing devices embodied in hardware, software, firmware, and/or a combination thereof, that enables capture of an image representing a captured sample, where the captured image processable using focused image generation and processing. In some embodiments, the sample capture apparatus includes components that intake a particular type of sample for generation of a corresponding image. Non-limiting examples of sample capture apparatuses include lens-based capture apparatuses and sample capture apparatuses.

The term "lens-less holography apparatus" refer to a sample capture apparatus that utilizes lens-less holographic microscopy to capture a raw digital holographic microscopy image representing a captured sample. In some embodiments, a lens-less holography apparatus include a medium that captures object(s) from a particular sample and laser(s) projecting light through the object, and a sensor positioned for capturing raw digital holographic microscopy image(s) representing incident light rays projected through object(s) caught in the capture medium.

The term "hologram processing system" refers to one or more computing devices embodied in hardware, software, firmware, and/or a combination thereof, that generates object identification data for object representations within a raw digital holographic microscopy image via comparison with any number of annotated focused images including a plurality of channels. In some embodiments, a hologram processing system trains and/or stores a model trained based on annotated focused images having particular assigned channels, such that the trained model performs such comparisons and generates object identification data for one or more object representations in a raw digital holographic microscopy image.

The term "target focal length" refers to a physical or simulated distance between an image sensor and an object captured in a holography capture medium. The term "target focal length" refers to a physical or simulated distance at which object representation(s) in a particular image are depicted as focused. The target focal length may be simulated utilizing one or more algorithm(s) that simulate alternative representations based on a source image and corresponding target focal length associated with the source image. The term "range of target focal lengths" refers to any number of target focal lengths for which source images are to be generated and/or processed for generating object identification data for classifying object representations in such source image(s).

The terms "captured object representation" and "object representation" refers to a portion of data within an image that corresponds to a depiction of a particular object within the image. A particular image may include any number of object representations, each of which may be represented by different data portions of the image and/or one or more overlapping portions of an image.

The term "boundary of an object representation" refers to data representing a bounding box, pixel array, or other determinable portion of a particular image that defines an object representation corresponding to an object captured in the particular image.

The term "object classification" and "classification" refers to a category, definition, or other description of an object based on a corresponding object representation. In some embodiments, an object classification set represents the possibilities from which a selection of an object classification is made.

The term "object identification data" refers to data that represents a determined classification corresponding to a particular object representation captured within a particular image, or a likelihood of one or more classifications corresponding to a particular object representation captured within a particular image. In some embodiments, object identification data indicates a classification from a set of possible object classifications, or a probability of one or more object classification(s) from a set of possible object classifications. In some embodiments, object identification data corresponding to a particular image includes one or more additional and/or alternative data values associated with concentration of a particular object classification, count of a particular object classification, or other determination associated with a particular object classification.

The term "raw digital holographic microscopy image" refers to a holographic image representation of a particular sample captured utilizing hologram microscopy. In some embodiments, a raw digital holographic microscopy image includes object representations at a particular hardware-defined target focal length.

The term "grayscale focused image" refers to a single channel image representing a raw digital holographic microscopy image focused, through hardware or software simulation, at a particular target focal length.

The term "focused image" refers to an image including one or more channels, with each channel assigned a grayscale focused image associated with a different target focal length.

The term "annotation data" refers to electronically managed data that correlates at least a portion of an image with object identification data representing a particular object classification. In some embodiments, annotation data includes a bounding box and/or other data defining a portion of an image that corresponds to the particular object identification data.

The term "annotated focused image" refers to a focused image including or associated with annotation data that labels one or more portion(s) of the focused image corresponding to particular object representation(s) in the focused image. In some embodiments, an annotated image is associated with annotation data that comprises a subset of data specific to annotations for each channel of a plurality of channels. Alternatively or additionally, in some embodiments an annotated focused image is associated with annotation data that includes annotations in any one of the channels of a plurality of channels.

The term "training raw digital holographic microscopy image" refers to a raw digital holographic microscopy image used to generate focused images for learning pattern recognition features of particular objects, and/or training a model to perform such pattern recognition, via comparison.

The term "training subset of annotated focused images" refers to any number of annotated focused images selected for use in configuring parameters and/or hyperparameters of a model that represent learned features of object representations indicating a likelihood of a particular object classification based on such features.

The term "test subset of annotated focused images" refers to any number of annotated grayscale focused images selected for use in determining the accuracy of a model or a comparison algorithm upon completion of training.

The term "validation subset of annotated focused images" refers to any number of annotated grayscale focused images selected for use in determining a current accuracy of a model during training of the model. In some embodiments, such an accuracy is utilized to determine when to cease training of the model by satisfying a particular accuracy threshold.

The term "channel" refers to a single dimension component of an image that represents a configuration of each portion of an image based on a particular value or vector of values. In some embodiments, an image comprises a single channel, such that the single channel defines the configuration (e.g., brightness) of each portion of the image. In some embodiments, an image comprises multiple channels, such that each portion of the image embodies a composite or combination of such portions from each of the images assigned to each channel.

The term "middle channel" refers to a particular channel of a multi-channel image that is assigned a single channel image within which a particular object representation via a selection algorithm. In some embodiments, the middle channel is assigned to an object representation that is determined to be best in focus. In some embodiments, channels are arranged in a defined order, and the middle channel corresponds to the numerically most central index of the ordered channels.

The term "best target focal length" with respect to a particular object representation refers to a target focal length at which the object representation is depicted as best in focus within a corresponding image depicting the object representation at the target focal length. In some embodiments, a best target focal length for a particular object representation is designated manually (e.g., through manual input or through annotation of the object representation at a particular target focal length). In some embodiments, a best target focal length is automatically designated by a computing device utilizing one or more algorithm(s) that define best in focus based on one or more parameters processable from the image.

The term "shorter channel" refers to a particular channel of a multi-channel image that is assigned a single channel image corresponding to a target focal length that is shorter than the best target focal length corresponding to the middle channel of the multi-channel image. For example, for a particular object representation, in a circumstance where the image in which the particular object representation is selected for a middle channel corresponds to a focal length of X, the shorter channel may be assigned a particular image corresponding to a target focal length of Y where Y<X.

The term "longer channel" refers to a particular channel of a multi-channel image that is assigned a single channel image corresponding to a target focal length that is greater than the best target focal length corresponding to the middle channel of the multi-channel image. For example, for a particular object representation, in a circumstance where the image in which the particular object representation is selected for a middle channel corresponds to a focal length of X, the longer channel may be assigned a particular image corresponding to a target focal length of Z where Z>X.

The term "offset" refers to a defined numeric offset from a best target focal length that is used to identify a corresponding image at a shorter target focal length to be assigned to a shorter channel and/or a corresponding image at a longer target focal length to be assigned to a longer channel. In some embodiments, the offset is predetermined. In some embodiments, the offset is input by a user. In some embodiments, an offset is used such that channels of the multi-channel focused image represent consecutive target focal lengths of a range of target focal lengths. For example, if each value in a range of target focal lengths is separated by a predefined difference (e.g., a difference between target focal lengths of 0.01), the default offset may be set to the predefined difference between such values in the range of target focal lengths (e.g., an offset of 0.01).

The term "spectral propagation algorithm" refers to an algorithm for simulating propagation of a wave field generated by projection of a light ray through an object to any number of determinable target focal lengths. In some embodiments, a spectral propagation algorithm generates a grayscale focused image simulated to be focused at a particular target focal length, or a plurality of grayscale focused images simulated to be focused across a range of target focal lengths. One or ordinary skill in the art to which this disclosure relates will appreciate that any of a myriad of several spectral propagation algorithms may be used in various contexts, for example angular spectrum propagation methods.

The term "selection algorithm" refers to one or more computer-implemented process(es) for selecting a target focal length and/or a particular object representation for assigning to a particular channel based at least in part on one or more data-driven determination(s). A selection algorithm selects a target focal length and/or a particular object representation based at least in part on any data-driven determination(s) derived from image processing of the particular object representation. Non-limiting example of a selection algorithm include one or more computer-implemented process(es) that select a particular object representation corresponding to a particular target focal length based at least in part on a determination that the particular object representation is associated with a best focus of a plurality of object representations, the particular object representation is associated with a focus exceeding a focus threshold, or the particular object representation is determinable as a particular object classification from one or more other characteristics representing in the particular object representation.

Example Systems and Apparatuses of the Disclosure

FIG. 1 illustrates a block diagram of a system that may be specially configured within which embodiments of the present disclosure may operate. Specifically, FIG. 1 depicts an example system 100 configured to enable capture of raw digital holographic microscopy image(s) associated with captured samples and remote processing of such raw digital holographic microscopy images for object identification. In one example context, as described throughout, the system 100 may enables capture of raw digital holographic microscopy images corresponding to one or more sample(s) (e.g., air samples, liquid samples, other fluid samples, and/or the like) imaged using digital holography, and processing of such images for purposes of generating object classification data corresponding to object representations within the raw digital holographic microscopy images. The system 100 includes a sample capture apparatus 104 and a hologram processing system 102. The sample capture apparatus 104 and the hologram processing system 102 communicate over a particular communications network 106.

In some embodiments, the sample capture apparatus 104 and the hologram processing system 102 are embodied as separate computing devices. In this regard, data may be transmitted between the separate computing devices to enable the processing described herein, for example over the communications network 106 embodying wired and/or wireless communication capabilities connecting such devices over a short or long communication range. In some other embodiments, the sample capture apparatus 104 and the hologram processing system 102 are embodied in a single device, system, apparatus, and/or the like. For example, the sample capture apparatus 104 and the hologram processing system 102 may be embodied as subsystems within a shared housing. In some such embodiments, the communications network 106 connecting the sample capture apparatus 104 and the hologram processing system 102 may be embodied by a universal bus and/or other wiring that enables data transfer between such subsystems within the shared housing.

The sample capture apparatus 104 includes one or more computing device(s), apparatus(es), and/or the like embodied in hardware, software, firmware, and/or a combination thereof, that intakes a sample and generates a raw digital holographic microscopy image of the sample using holographic microscopy. For example, in some embodiments, the sample capture apparatus 104 includes sample intake components, such as intake pump(s), a sampling intake conduit, an exhaust vent, and/or the like. Additionally or alternatively, in some embodiments, the sample capture apparatus 104 includes holography capture components, such as a specially coated film, material, or other capture medium designed to capture in place objects from the sample as air is taken in. It should be appreciated that in other embodiments, the capture medium may differ based on the type of sample to be collected (e.g., a different fluid) and/or no particular capture medium may exist (e.g., where image(s) are captured as the sample traverses through a particular path upon intake). Additionally or alternatively still, in some embodiments, the sample capture apparatus 104 includes lens-less holography imaging components, such as one or more light sources that project light through a capture medium and objects captured thereon, an image sensor that captures a raw digital holographic microscopy image of the capture medium based on light rays shown through the capture medium and incident to the image sensor, and/or the like. Additionally or alternatively still, in some embodiments, the sample capture apparatus 104 includes specially configured hardware, software, firmware, and/or a combination thereof (e.g., a specially configured processor) that outputs captured raw digital holographic microscopy image(s) for processing by one or more associated systems, such as via the hologram processing system 102. In this regard, in one particular example context, the sample capture apparatus 104 may use holographic microscopy to capture raw digital holographic microscopy images including object representations of objects caught in the capture medium, and output the raw digital holographic microscopy images for processing to identify the various object representations therein. In other embodiments, the sample capture apparatus 104 includes components for lens-based holographic microscopy.

The hologram processing system 102 includes one or more computing device(s), apparatus(es), and/or the like embodied in hardware, software, firmware, and/or a combination thereof, that processes raw digital holographic microscopy image(s) to generate and/or output object identification data corresponding to object representations within the raw digital holographic microscopy image. In some embodiments, the hologram processing system 102 generates and/or outputs object identification data for one mor ore object representations based on comparison(s) to annotated focused images, where such annotated focused images are associated with annotation data at the target focal lengths at which such object representations are determined via a selection algorithm (e.g., best in focus at the best target focal length for a particular object representation, or otherwise selected). In this regard, the hologram processing system 102 generates accurate object identification data for such object representations based on the specific features of such object representations learned from the annotated focused images. Additionally or alternatively, in some embodiments, the hologram processing system 102 generates annotated focused images for in training one or more model(s) to generate and/or output particular object identification data based on comparisons to the annotated focused images.

In some embodiments, the hologram processing system 102 is embodied by a specially configured user device. The specially configured user device may be owned and/or operated by a particular user initiating analysis of samples captured from the environment where the sample capture apparatus 104 is positioned. In some embodiments, the specially configured user device embodying the hologram processing system 102 is positioned locally to the sample capture apparatus 104, such that the hologram processing system 102 and the sample capture apparatus 104 are communicable via a wired connection or via a short-range wireless communication protocol. The specially configured user device may be specially configured via hardware, software, firmware, and/or a combination thereof, that provides the object identification data generation and/or outputting functionality described herein. Non-limiting examples of such a hologram processing system include, for example, a smartphone, a tablet, a personal computer, a laptop, a smart home device, a wearable, a tablet, and/or a specially designed hardware/software device (e.g., a specially configured raspberry pi, Arduino, and/or the like). Such computing devices may access and/or execute a specially configured software application (or "app") that provides the object identification data generation and/or outputting functionality described herein.

Alternatively or additionally, in some embodiments, the hologram processing system 102 is embodied by one or more processing system(s) positioned in a remote location from the sample capture apparatus 104. The remote processing system(s) may include any number of computing device(s), subsystem(s), and/or the like, embodied in hardware, software, and/or a combination thereof. For example, in some embodiments, the hologram processing system 102 includes one or more specially configured server(s), database(s), and/or the like, that perform the object identification data generation and/or outputting functionality described herein. Alternatively or additionally, in some embodiments, the hologram processing system 102 includes a specially configured, remote personal computer that performs the object identification data generation and/or outputting functionality described herein. In some such embodiments, the hologram processing system 102 is configured to perform the described functionality utilizing one or more executing specialized software applications (or 37 apps). The hologram processing system 102 may be communicable with the sample capture apparatus 104 utilizing long-range communications capabilities, such as access to the Internet and/or the like.

The communications network 106 comprises any combination of computing devices embodying a public, private, and/or hybrid computing network capable of communicating data over a particular range. In some embodiments, the communications network 106 is embodied by one or more network access points, relays, base stations, data transmission devices, cellular communication towers, and/or other communication devices. In some embodiments, the communications network 106 includes or is embodied by any number of user-owned and/or non-user computing devices facilitating access to and/or embodying a public network, such as the Internet. Additionally or alternatively, in some embodiments, the communications network 106 includes one or more computing devices of a user's local network, for example one or more network access point(s), modem, router, and/or the like, that enable access to a public, private, or hybrid network of computing devices. Alternatively or additionally, in some embodiments, the communications network 106 comprises a close-range communication network facilitated by a particular close-range communication protocol used to connect such computing devices, for example Bluetooth and related hardware for generating corresponding Bluetooth transmission signals. It should be appreciated that the communications network 106 may be accessible via any of a myriad of communications mechanisms and/or protocols, including without limitation a wired connection, a Wi-Fi connection, a cellular connection, Bluetooth, and/or the like.

FIG. 2 illustrates a block diagram of an example hologram imagery processing apparatus that may be specially configured in accordance with at least some example embodiments of the present disclosure. In some embodiments, the hologram processing system 102 is embodied by one or more computing systems, such as the hologram processing apparatus 200 as depicted and described in FIG. 2. The hologram processing apparatus 200 includes processor 202, memory 204, input/output circuitry 206, communications circuitry 208, hologram processing circuitry 210, and/or comparison learning circuitry 212. The hologram processing apparatus 200 may be configured, using one or more of the sets of circuitry 202, 204, 206, 208, 210, and/or 212, to execute the operations described herein.

Although components are described with respect to functional limitations, it should be understood that the particular implementations necessarily include the user of particular computing hardware. It should also be understood that certain of the components described herein may include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the hologram processing apparatus 200 may provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) may be in communication with the memory 204 via a bus for passing information among components of the hologram processing apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the hologram processing apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the hologram processing apparatus 200, and/or one or more remote or "cloud" processor(s) external to the hologram processing apparatus 200.

In an example embodiment, the processor 202 may be configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions may specifically configure the processor 202 to perform the algorithms embodied in the specific operations described herein when such instructions are executed.

As one particular example, the processor 202 may be configured to perform various operations associated with raw digital holographic microscopy image processing functionality for generation and/or outputting object identification data, for example as described with respect to the hologram processing system 102 and/or as described further herein. In some embodiments, the processor 202 includes hardware, software, firmware, and/or a combination thereof, that receives and/or retrieves raw digital holographic microscopy image(s) for processing. Alternatively or additionally, in some embodiments, the processor 202 includes hardware, software, firmware, and/or a combination thereof, that generates grayscale focused image set corresponding to a raw digital holographic microscopy image. Alternatively or additionally, in some embodiments, the processor 202 includes hardware, software, firmware, and/or a combination thereof, that generates one or more (or a set of) object identification data by comparing grayscale focused images to a plurality of annotated focused images that are specially configured including a plurality of channels assigned particular grayscale focused images used for learning features of such object representations. Alternatively or additionally still, in some embodiments, the processor 202 includes hardware, software, firmware, and/or a combination thereof, that outputs object identification data representing object classifications of object representations in the raw digital holographic microscopy image. Alternatively or additionally, in some embodiments, the processor 202 includes hardware, software, firmware, and/or a combination thereof, that configures one or more annotated focused images with focused grayscale images in particular channels, and associated with particular annotation data. Alternatively or additionally still, in some embodiments, the processor 202 includes hardware, software, firmware, and/or a combination thereof, that trains one or more model(s) based on training annotated focused images to learn features of the object representations for performing pattern matching on received raw digital holographic microscopy images via comparison with such learned features.

In some embodiments, the hologram processing apparatus 200 includes input/output circuitry 206 that may, in turn, be in communication with processor 202 to provide output to the user and, in some embodiments, to receive an indication of a user input. The input/output circuitry 206 may comprise one or more user interface(s) and may include a display that may comprise the interface(s) rendered as a web user interface, an application user interface, a user device, a backend system, or the like. In some embodiments, the input/output circuitry 206 may also include a keyboard, a mouse, a joystick, a touch screen, touch areas, soft keys, a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

The communications circuitry 208 may be any means such as a device or circuitry embodied in either hardware or a combination of hardware and software that is configured to receive and/or transmit data from/to a network and/or any other device, circuitry, or module in communication with the hologram processing apparatus 200. In this regard, the communications circuitry 208 may include, for example, a network interface for enabling communications with a wired or wireless communication network. For example, the communications circuitry 208 may include one or more network interface card(s), antenna(s), bus(es), switch(es), router(s), modem(s), and supporting hardware, firmware, and/or software, or any other device suitable for enabling communications via one or more communication network(s). Additionally or alternatively, the communications circuitry 208 may include circuitry for interacting with the antenna(s) and/or other hardware or software to cause transmission of signals via the antenna(s) or to handle receipt of signals received via the antenna(s).

The hologram processing circuitry 210 includes hardware, software, firmware, and/or a combination thereof, configured to support various functionality associated with processing a raw digital holographic microscopy image to generate and/or output object identification data corresponding to object representations within the raw digital holographic microscopy image. For example, in some embodiments, the hologram processing circuitry 210 includes hardware, software, firmware, and/or a combination thereof, configured to retrieve and/or receive a raw digital holographic microscopy image. Additionally or alternatively, in some embodiments, the hologram processing circuitry 210 includes hardware, software, firmware, and/or a combination thereof, configured to generate a grayscale focused image set corresponding to a raw digital holographic microscopy image, the grayscale focused image set including a grayscale focused image focused at each target focal length within a range of target focal lengths. Additionally or alternatively, in some embodiments, the hologram processing circuitry 210 includes hardware, software, firmware, and/or a combination thereof, configured to apply a raw digital holographic microscopy image to a spectral propagation algorithm to generate the focused grayscale images across a range of target focal lengths. Additionally or alternatively, in some embodiments, the hologram processing circuitry 210 includes hardware, software, firmware, and/or a combination thereof, configured to generate one or more (or a set of) object identification data by comparing the grayscale focused image set to a plurality of annotated focused images, each annotated focused image specially configured to include particular images positioned in particular channels of the annotated focused image and annotation data associated with such images. In some embodiments, the hologram processing circuitry 210 includes hardware, software, firmware, and/or a combination thereof, configured to perform such comparisons by applying the raw digital holographic microscopy image to a model specially trained based at least in part on annotated focused images as described herein. Additionally or alternatively, in some embodiments, the hologram processing circuitry 210 includes hardware, software, firmware, and/or a combination thereof, configured to output such object identification data. In some embodiments, the hologram processing circuitry 210 includes hardware, software, firmware, and/or a combination thereof, configured to receive a raw digital holographic microscopy image captured via a lens-less holography apparatus, and/or capture a raw digital holographic microscopy image via an image sensor.

In some embodiments, the hologram processing circuitry 210 performs one or more of the above-mentioned actions using, in whole or in part, the communications circuitry 208, input/output circuitry 206, and/or processor 202. For example, the hologram processing circuitry 210 may leverage the communications circuitry 208 to perform data receiving and/or transmitting steps, and/or may leverage the input/output circuitry 206 to perform data outputting (e.g., causing rendering of user interfaces) and/or inputting steps (e.g., receiving user input via device hardware, peripherals, and/or the like, for initiating one or more process(es)). It should be appreciated that, in some embodiments, hologram processing circuitry 210 may include a separate processor, specially configured field programmable gate array (FPGA), or a specially programmed application specific integrated circuit (ASIC).

The comparison learning circuitry 212 includes hardware, software, firmware, and/or a combination thereof, configured to support various functionality for learning features of object representations corresponding to particular object identification data based on comparisons with annotated focused images utilized for training. For example, in some embodiments, the comparison learning circuitry 212 includes hardware, software, firmware, and/or a combination thereof, configured to train one or more specially configured model(s) that learn features of object representations corresponding to different object identification data based on comparisons to a training set of annotated focused images. Additionally or alternatively, in some embodiments, the comparison learning circuitry 212 includes hardware, software, firmware, and/or a combination thereof, configured to initiate one or more algorithm(s) for learning features of object representations corresponding to different object identification data based on comparisons to a training set of annotated focused images. Additionally or alternatively, in some embodiments, the comparison learning circuitry 212 includes hardware, software, firmware, and/or a combination thereof, configured to generate annotated focused images. In some such embodiments, the comparison learning circuitry 212 is configured to assign training grayscale focused images to various channels of a set of annotated focused image based on a best target focal length for a particular object representation. Additionally or alternatively, in some embodiments, the comparison learning circuitry 212 includes hardware, software, firmware, and/or a combination thereof, configured to generate annotation data for object representations within a particular focused image, and/or associate annotation data with a particular focused image. Additionally or alternatively, in some embodiments, the comparison learning circuitry 212 includes hardware, software, firmware, and/or a combination thereof, configured to generate a test subset, training subset, and validation subset of a plurality of annotated focused images, and to trains a model based at least in part on such subsets.

In some embodiments, the comparison learning circuitry 212 performs one or more of the above-mentioned actions using, in whole or in part, the communications circuitry 208, input/output circuitry 206, and/or processor 202. For example, the comparison learning circuitry 212 may leverage the communications circuitry 208 to perform data receiving and/or transmitting steps, and/or may leverage the input/output circuitry 206 to perform data outputting (e.g., causing rendering of user interfaces) and/or inputting steps (e.g., receiving user input via device hardware, peripherals, and/or the like, for initiating one or more process(es)). It should be appreciated that, in some embodiments, comparison learning circuitry 212 may include a separate processor, specially configured field programmable gate array (FPGA), or a specially programmed application specific integrated circuit (ASIC).

It should be appreciated that, in some embodiments, one or more of the sets of circuitries 202-212 are combinable. Alternatively or additionally, in some embodiments, one or more of the modules performs some or all of the functionality described associated with another component. For example, in some embodiments, the sets of circuitry 210 and 212 are combined into a single module embodied in hardware, software, firmware, and/or a combination thereof. Similarly, in some embodiments, one or more of the sets of circuitry 210 and/or 212 is combined such that the processor 202 performs one or more of the operations described above with respect to each of these modules.

Example Visualization for Sample Intake and Imaging

FIG. 3 illustrates a visualization of sample intake and raw digital holographic microscopy image capture in accordance with at least some example embodiments of the present disclosure. Specifically, FIG. 3 illustrates a visualization of sample intake and imaging via a specially configured lens-less holography apparatus 300. In some embodiments, the sample capture apparatus 104 is embodied by one or more specially configured computing devices, such as the specially configured lens-less holography apparatus 300 depicted and described in FIG. 3. FIG. 3 is specifically described with respect to a particular sample context of air sample intake and processing. It should be appreciated that embodiments may be deployed within other example sample types as well, for example for processing liquid samples, other fluid samples, and/or the like.

As illustrated, the lens-less holography apparatus 300 includes various specially configured components that enable air sample intake and lens-less holography imaging functionality. For example, the lens-less holography apparatus 300 includes a sample intake conduit 312. The sample intake conduit 312 may extend from within the lens-less holography apparatus 300 to channel an air sample into the lens-less holography apparatus 300 for capturing. As illustrated, the lens-less holography apparatus 300 further includes an intake pump 314. The intake pump 314 may cause airflow through the lens-less holography apparatus 300, such that an air sample is taken in via the sample intake conduit 312 and flows through one or more components of the lens-less holography apparatus 300. For example, the intake pump may draw in an air sample and cause the air sample to flow through a capture medium to cause object(s) in the air sample to be captured within the capture medium. Additionally, as illustrated, the lens-less holography apparatus 300 includes an exhaust 316 that dispenses of dispenses of air samples taken in by the lens-less holography apparatus 300.

The lens-less holography apparatus 300 includes a capture medium 306. The capture medium 306 may include various components that are specially designed to capture objects as air flows through such components. For example, in some embodiments, the capture medium 306 includes a membrane or film specially treated with a particular substance that traps objects within the substance and/or membrane as such objects flow through it. It should be appreciated that the capture medium 306 may be embodied by any of a myriad of means known in the art for capturing objects from air samples that flow through such means, such as to facilitate lens-less holography by projecting light through such objects positioned in the capture medium. The capture medium 306 may be positioned within the lens-less holography apparatus 300 at any position suitable to enable air samples to be drawn in and flow through the capture medium 306.

Additionally, as illustrated, the lens-less holography apparatus 300 includes light sources 304. The light sources 304 are positioned to project light rays through the capture medium 306. In this regard, the projected light rays may interact with the objects caught within the capture medium 306. It should be appreciated that the light sources 304 may include any number and/or configuration of light sources to project light rays across the entirety of the capture medium 306. In one example context, the light sources 304 include one or more lasers, LEDs, and/or the like, positioned towards the capture medium 306.

Additionally, as illustrated, the lens-less holography apparatus 300 includes an image sensor 308. In some embodiments, the image sensor 308 includes specially configured hardware that converts attenuation of light rays into data signals. For example, objects trapped in a capture medium, such as the capture medium 306, cause constructive and destructive interference of light rays projected via the light sources 304. The light rays may be used to generate a particular number of data signals corresponding to pixel array of the image sensor, for example. In this regard, the image sensor 308 may generate, store, and/or output the raw digital holographic microscopy image 318 generated based on light rays that interact with the image sensor 308 through the capture medium 306 and/or objects caught therein. In some embodiments, the image sensor 308 generates signals during a period of exposure, for example upon activation of a particular process for intaking an air sample and imaging the sample as described herein. The resulting raw holographic microscopy image may include object representations with brighter and darker regions, with the darker regions corresponding to object representations within the captured image. The raw holographic microscopy image may be focused in a manner that depicts object representations somewhat darker than surrounding environment (e.g., where an object is not present). In some contexts, object representations include some intensity variation even focused, revealing structures, textures, and/or other characteristics of the object corresponding to the object representation.

In some embodiments, the image sensor 308 is configure to capture a particular format of image. For example, in some embodiments, the image sensor 308 captures intensity or brightness values across a particular grid, and generates a grayscale raw holographic microscopy image based on such value(s) at each pixel. Alternatively or additionally, in some embodiments, a color pattern array (e.g., a color filter, such as a Bayer filter) may be used to determine the color content based on captured intensity or brightness value(s), and a color raw holographic microscopy image based at least in part on the interpreted color content. In some embodiments, grayscale raw holographic microscopy images are processed to further take advantage of smoothing that occurs during reconstruction of a color image. In other embodiments, a color raw holographic microscopy image is processed either as a composite image via all channels at once, or by individually processing each grayscale image at each color channel of the color raw holographic microscopy image. It should be appreciated that color and/or other multi-channel images may be embodied in any of a myriad of known image formats (e.g., JPG, PNG, and/or the like) and/or custom formats.

In some embodiments, the image sensor 308 includes or is associated with processing and/or activation circuitry (not depicted) that activates the image sensor 308 for capturing the raw digital holographic microscopy image 318. Additionally or alternatively, the processing and/or activation circuitry may similarly control operation of one or more other components of the lens-less holography apparatus 300. For example, in some embodiments, processing and/or activation circuitry activates the light sources 304, intake pump 314, exhaust 316, and/or the image sensor 308 in a particular order to cause intake of a particular air sample and generation of a raw digital holographic microscopy image corresponding to the air sample. For example, in some embodiments, such processing and/or activation circuitry may be utilized to activate all components of the lens-less holography apparatus 300 upon initiation by a user (e.g., receiving a remote signal from a user or receiving user input via a particular component of the lens-less holography apparatus 300, for example via a button of the processing and/or activation circuitry). As illustrated for example, in response to such initiation, the lens-less holography apparatus 300 may intake the air sample 302 and capture the raw digital holographic microscopy image 318 representing objects caught from the air sample 302.

In some embodiments, the image sensor 308 includes or is associated with particular communications circuitry for outputting the raw digital holographic microscopy image 318 for further processing. For example, in some embodiments, the image sensor 308 is associated with communications circuitry for outputting the raw digital holographic microscopy image 318 to a hologram processing system 102 to generate object identification data for object representations within the raw digital holographic microscopy image 318. In some embodiments, for example, the image sensor 308 includes or is associated with wired communications circuitry that enables output of the raw digital holographic microscopy image 318 to a hologram processing system 102 embodied by the hologram processing apparatus 200, and/or enables receiving of one or more object identification data, or a set of object identification data, from the hologram processing apparatus 200. Alternatively or additionally, in some embodiments, the image sensor 308 includes or is associated with wireless communications circuitry that enables wirelessly outputting the raw digital holographic microscopy image 318 to a hologram processing system 102 embodied by the hologram processing apparatus 200, and/or enables wirelessly receiving of one or more object identification data, or a set of object identification data, from the hologram processing apparatus 200.

Example Image Configurations and Representations of the Present Disclosure

Having described example systems and apparatuses of the disclosure, example image configurations and representations in accordance with the present disclosure will now be described. In this regard, it should be appreciated that such image configurations and representations may embody one or more of the image data objects described herein, including without limitation raw digital holographic microscopy images, multi-channel focused images, single-channel grayscale focused images, and/or the like. It will further be appreciated that the example configurations and representations are exemplary and, in other embodiments, one or more other representations and/or configurations of images may be utilized in accordance with the scope of this description and the appended claims. Accordingly, the particular example representations and configurations as depicted and described with respect to the subsequent figures should not limit the scope and spirit of this disclosure.

It should be appreciated that each of the flowcharts depicts an example computer-implemented process that may be performed by one or more of the apparatuses, systems, devices, and/or computer program products described herein, for example utilizing one or more of the specially configured components thereof. The blocks indicate operations of each process. Such operations may be arranged in any of a number of ways, including without limitation as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes may include some or all operational steps described and/or depicted, including one or more optional blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 4 illustrates an example grayscale focused image including various object representations generated from a raw digital holographic microscopy image captured in accordance with at least some example embodiments of the present disclosure. Specifically, FIG. 4 illustrates an example grayscale focused image 400 generated from a raw digital holographic microscopy image at a particular defined target focal length. The example grayscale focused image 400 may embody the raw digital holographic microscopy image 318 and/or may represent a particular instance of a grayscale focused image generated from the raw digital holographic microscopy image 318 captured via an image sensor of a sample imaging apparatus, such as the lens-less holography apparatus 300.

As illustrated, the example grayscale focused image 400 generated from a raw digital holographic microscopy image is embodied as a grayscale image. The grayscale image represents a capture medium with various objects caught by the capture medium. For example, in the context of air sampling, the grayscale focused image 400 generated from a raw digital holographic microscopy image may represent a capture medium having airborne particles or particulates caught from a particular air sample. In the context of a liquid sample, the grayscale focused image 400 generated from a raw digital holographic microscopy image may represent particles within the liquid captured within a particular medium, or at a certain point in an intake path. In this regard, the raw digital holographic microscopy image may include any number of object representations that each represent a particular object caught by the capture medium.

As depicted in the example grayscale focused image 400 generated from a raw digital holographic microscopy image, each object representation corresponds to a defined darkened portion of the grayscale focused image 400 generated from a raw digital holographic microscopy image. For example, a particular object representation may correspond to darkened pixels within the raw digital holographic microscopy image that are all contiguous or within a particular defined area. It should be appreciated that not all pixels or portions of the grayscale focused image 400 generated from a raw digital holographic microscopy image that correspond to a single object representation need to be exactly the same. In some circumstances, the value of each particular pixel or portion of the grayscale focused image 400 generated from a raw digital holographic microscopy image is based on the intensity of light rays that interact with different portions of an image sensor, which may be reduced based on occlusion, refraction, reflection, and/or other effects of the object caught in the capture medium. It should be appreciated that some shading may also occur due to the nature of the capture medium itself, the light rays projected through the capture medium, and/or interactions with the capture medium caused by objects impacting said capture medium. It should be appreciated that any of a number of known methodologies may be applied to distinguish object representations from a representation of the capture medium and/or effects thereof, such as background algorithms. It will further be appreciated that any of a myriad of known algorithms for performing segmentation of object representations from within an image (e.g., identifying bounding boxes, pixels corresponding to a particular object representation, and/or the like) may be utilized to extract the relevant portions of a grayscale focused image for annotating.

A captured raw digital holographic microscopy image may include any number of object representations corresponding to any number of caught objects. For example, the example grayscale focused image 400 generated from a raw digital holographic microscopy image includes thousands of object representations depicted throughout the image. Such object representations may range in size, for example ranging from a few microns (or even smaller) to hundreds of microns in the context of air sampling. In some embodiments, a captured raw digital holographic microscopy image is processed to determine object identification data that categorizes each object representation within the grayscale focused image 400 generated from a raw digital holographic microscopy image. Alternatively or additionally, in some embodiments, the object representations within the grayscale focused image 400 generated from a raw digital holographic microscopy image are processed to determine whether one or more particular category of object is represented. For example, in one example context, the grayscale focused image 400 generated from a raw digital holographic microscopy image is processed to determine whether one or more object representation(s) that correspond to object identification data for particularly dangerous categories of object exist in within the raw digital holographic microscopy image (e.g., particles that indicate airborne diseases, airborne contaminants, and/or that otherwise pose a risk to human health).

It should be appreciated that the grayscale focused image 400 generated from a raw digital holographic microscopy image may be captured at a particular target focal length. The particular target focal length may be based on the hardware configuration of the imaging apparatus utilized to capture the grayscale focused image 400 generated from a raw digital holographic microscopy image, for example based on the positioning of the image sensor and the capture medium. In this regard, within the grayscale focused image 400 generated from a raw digital holographic microscopy image some object representations may be more in focus (e.g., sharper, more well-defined, and/or otherwise clearer) than other object representations within the grayscale focused image 400 generated from a raw digital holographic microscopy image. Not all objects within the capture medium may be caught at the same distance from the image sensor, for example due to variations in the design and/or configuration of the capture medium itself, effects of impacts by object(s) caught by the capture medium (e.g., ripples in a gel or other coating of a capture medium caused by impacting objects), and/or the like. Accordingly, objects positioned at distances closer to the target focal length of the image sensor may be represented in better focus (e.g. sharper, more well-defined, and/or otherwise clearer) by object representations within the grayscale focused image 400 generated from a raw digital holographic microscopy image, whereas objects positioned further from the target focal length of the image sensor may be represented worse in focus (e.g., blurry, not well-defined, and/or otherwise less clear) by object representations within the grayscale focused image 400 generated from a raw digital holographic microscopy image.

In some embodiments, the grayscale focused image 400 generated from a raw digital holographic microscopy image is processed utilizing one or more algorithm(s) to simulate alternative target focal lengths within a particular range of target focal lengths. The range of target focal lengths may be predefined as a particular, set range of target focal lengths. For example, in some embodiments the range of target focal lengths is predefined based on a system-driven or user-inputted determination of target focal lengths at which objects are expected to be present. In one example context, the range of target focal lengths represents [6.30, 6.60] millimeters inclusive (or in other words, 6.30 millimeters to 6.60 millimeters, inclusive) as the expected range from the sensor at which objects are expected to be. In other embodiments, the range of target focal lengths is determined by such embodiments (e.g., based on one or more determinations associated with the system, the grayscale focused image 400 generated from a raw digital holographic microscopy image, and/or the like).

Such embodiments may utilize such algorithm(s) to generate additional images corresponding to such a range of target focal lengths. For example, in some embodiments, one or more spectral propagation algorithm(s) (e.g., angular spectral propagation) is/are applied to the grayscale focused image 400 generated from a raw digital holographic microscopy image to generate such additional images simulating various target focal lengths. Each additional image may simulate the grayscale focused image 400 generated from a raw digital holographic microscopy image as though it were focused at a different target focal length from within the range of target focal lengths. In this regard, the grayscale focused image 400 generated from a raw digital holographic microscopy image may be processed utilizing one or more algorithm(s) to generate a set of grayscale focused images that includes a grayscale focused image simulated for focus at each target focal length of the range of target focal lengths. Utilizing the range of target focal lengths defined by [6.30, 6.60] for example, a grayscale focused image set including 31 total images is generated, the grayscale focused image set including a grayscale image simulated to be focused at each target focal length from 6.30 millimeters to 6.60 millimeters. In some embodiments, in circumstances where the grayscale focused image 400 generated from a raw digital holographic microscopy image corresponds to a particular target focal length, generation of an additional grayscale focused image simulated at that particular target focal length may be skipped.

FIG. 5 illustrates example object representations within grayscale focused images at various target focal lengths in accordance with at least some example embodiments of the present disclosure. Specifically, FIG. 5 depicts various portions of data from each grayscale focused image within a grayscale focused image set representing a raw digital holographic microscopy image simulated as focused at each target focal length of a range of target focal lengths from 6.37 to 6.54 inclusive (in other words [6.37, 6.54]). The particular depicted portions of data embody the portion of each grayscale focused image that corresponds to a particular object representation within the raw digital holographic microscopy image. Specifically, FIG. 5 includes a first set of object representations 502A, a second set of object representations 502B, a third set of object representations 502C, a fourth set of object representations 502D, and a fifth set of object representations 502E (collectively, "sets of object representations 502").

For example, the set of object representations 502A includes an extracted first portion of each grayscale focused image in a grayscale focused image set representing simulated focus at each target focal length in the range [6.37, 6.54], where the first portion corresponds to a first object representation of a first object within a raw digital holographic microscopy image. Similarly, the set of object representations 502B includes an extracted second portion of each grayscale focused image in the grayscale focused image set representing simulated focus at each target focal length in the range [6.37, 6.54]. In this regard, the set of object representations 502C similarly includes an extracted third portion corresponding to a third object representation in such grayscale focused images, the set of object representations 502D similarly includes an extracted fourth portion corresponding to a fourth object representation in such grayscale focused images, and the set of object representations 502E includes an extracted fifth portion corresponding to a fifth object representation in such grayscale focused images. In this regard, it should be appreciated that the particular extracted portions in each column correspond to different object representations in each grayscale focused image representing simulated focus at a particular target focal length. Similarly, each row represents a particular series of extracted portions corresponding to object representations for a single object across various target focal lengths in a range of target focal lengths.

As depicted, each object representations may improve or worsen in clarity as the target focal length changes. In this regard, each particular object corresponding to such object representations may be best in focus at different target focal lengths. The object representation in each grayscale focused image associated with a different target focal length may be processed and/or otherwise analyzed to determine the best target focal length for the particular object based on where the object representation corresponding to the object is best in focus. For example, the first object corresponding to the set of object representations 502A may be determined best in focus at target focal length 6.44. It should be appreciated that any number of objects may be best in focus at a particular shared target focal length, and/or different target focal lengths. For example, the second object corresponding to the set of object representations 502B may be determined best in focus at target focal length 6.39, and the third object corresponding to the set of object representations 502C may be determined best in focus at target focal length 6.42. Alternatively, the fourth object corresponding to the set of object representations 502D may be determined best in focus at target focal length 6.44. The fifth object corresponding to the set of object representations 502E may be determined best in focus at target focal length 6.51. Such determinations of where an object is best in focus may be utilized during training of one or more algorithm(s), model(s), and/or the like, for example as described further herein.

In some embodiments, the complete set of grayscale focused images including a grayscale focused image corresponding to each target focal length in the range of target focal lengths may be processed by one or more algorithm(s) that compare each object representation to features learned from annotated focused images. For example, in some embodiments, the set of grayscale focused images across a range of target focal lengths is inputted to a model specially trained based at least in part on annotated focused images. In this regard, the annotated focused images may be specially configured and/or generated based on the best target focal lengths for object representations captured in training images, and annotation data that indicates the object identification data for such object representations at the best target focal length and/or object representations at particular other target focal lengths offset from the best target focal length for the object representations of a particular object. In this regard, the specially configured algorithm(s) and/or model(s) may process such grayscale focused images to generate and/or output object identification data for one or more objects corresponding to object representations in the raw digital holographic microscopy image used to generate the set of focused grayscale images.

FIG. 6A illustrates example construction of example focused images including sequential grayscale focused images in a plurality of channels in accordance with at least some example embodiments of the present disclosure. In this regard, the focused images may be generated and associated with annotation data to generate annotated focused images used in learning one or more features indicative of a particular object classification represented by particular object identification data. As such, object identification data may be generated for object representations in a particular grayscale focused image based on comparison to features corresponding to particular object identification data as learned from the annotated focused images. For example, in some embodiments, the focused images may be annotated with particular annotation data to generate a set of annotated focused images used to train a specially configured model for generating object identification data for object representations in a particular grayscale focused image.

In one example context, the grayscale focused images comprising the object representations depicted in each of the set of object representations 502 embody training grayscale focused images generated from one or more training raw digital holographic microscopy images utilized for learning features of object representations at particular levels of focus. For example, in some embodiments, the grayscale focused image 400 generated from a raw digital holographic microscopy image as depicted and described with respect to FIG. 4 embodies a training raw digital holographic microscopy image captured during training of a specialized model for outputting object identification data for object representation(s) captured in the raw digital holographic microscopy image. In such embodiments, the grayscale focused image 400 generated from a raw digital holographic microscopy image embodying the training focused image is processed by one or more spectral propagation algorithms to generate the grayscale focused images including the object representations depicted in the sets of object representations 502.

In some embodiments, annotated focused images are generated based at least in part on a particular selection algorithm. The particular selection algorithm may be utilized to annotate a particular image, such that the particular image is annotated indicating its selection via the particular selection algorithm. In some embodiments, the particular selection algorithm selects a best target focal length for each object corresponding to object representations in each of the sets of object representations 502. The annotated focused images generated may include a plurality of channels. For example, in some embodiments the plurality of channels in an annotated focused images correspond to a number of channels processable by a particular model implementation. In one such example context, the plurality of channels correspond to color channels of an image (e.g., a red channel, a blue channel, and a green channel). In some such embodiments, one or more of the plurality of channels may be higher weighted—such as the green channel in certain Bayer filter-based implementations. In this regard, the grayscale focused image corresponding to the target focal length at which the object is selected (e.g., best in focus at the best target focal length for the particular object) may be assigned to the particular channel corresponding to the higher weight (e.g., the green channel) to higher weight the features identifiable from the image that is best in focus. Additionally or alternatively, such channel assignment may reduce the complexity of interpolation required when converting the focused image to a standard image format that estimates particular values (e.g., RGB color values) for each pixel. In yet some other embodiments, other color array patterns and/or other color filters may be utilized to capture and/or process such images.

In some embodiments, the middle channel is assigned based at least in part on another particular selection algorithm. For example, in some embodiments, the middle channel is assigned based at least in part on a selection algorithm that determines a particular grayscale image associated with a focal length where the object representation satisfies a particular satisfactory focus threshold. Alternatively or additionally, any other data-driven determination that a particular image should be selected for the middle channel. In some embodiments, a grayscale image selected for a particular channel is selected as having a satisfactory focus (e.g., based on an image processing-based determination) even if the image is not best in focus, or for example may select a second best in focus image, third best in focus image, and/or the like. Alternatively or additionally, in some embodiments, alternative characteristics associated with an image (e.g., other than focus) are utilized to select a particular selected object representation and/or corresponding first target focal length. For example, in some embodiments, the selection algorithm utilizes any one or more image processing algorithm(s) to visually distinguish an object of a particular object classification from objects of another object classification. Such a selection algorithm may or may not rely on focus of the objects, and/or may rely on other characteristics of an object of a particular object classification determinable from within a captured image including an image representation of the object.

It should be appreciated that in other embodiments, a focused image may be generated that includes any number of channels—with each channel assigned a grayscale focused image corresponding to a particular target focal length. In this regard, as the number of channels increases, the spatial features learned from such annotated focused images (e.g., during model training) similarly increases. The processing time and computing resources required for processing the number of channels may also increase as the number of channels increases. In some embodiments, the number of channels may be constrained based on the model implementation (e.g., based on a maximum number of features the model implementation is capable of learning), based on hardware configurations of the embodiments (e.g., limitations on processor power, memory, and/or the like), and/or based on limitations on processing time (e.g., limitations requiring output of object identification data within a particular time interval). It will be appreciated that embodiments with a wider the range of target focal lengths increase the number of images to be generated and improve the likelihood of generating a grayscale focused image where a particular particle is sufficiently in focus and/or best in focus, whereas embodiments with a narrower range of target focal lengths may perform with improved execution time based on the decreased number of images.

A first target focal length selected for an object corresponding to the first object representations set 502A may be determined and used to assign one or more channels of an annotated focused image. For example, in some embodiments, the first target focal length is determined corresponding to a particular image determined via a selection algorithm. In some such embodiments, the first target focal length is determined where the first target focal length represents a best target focal length for the object representations corresponding to a particular object. In some such embodiments, the target focal length at which an object is best in focus may be determined automatically or manually (e.g., based on user input). For example as depicted, the object representations in the first object representation set 502A are associated with a best target focal length of 6.44, where the corresponding object representation is best in focus.

As illustrated, the object representations of the first object representations set 502A are utilized to generate an annotated focused image assigned the channels indicated by the plurality of channels 602A. In some such embodiments, the grayscale focused image corresponding to this first target focal length (e.g., the best target focal length) is assigned to a particular channel of an annotated focused image. For example, in some embodiments, a first grayscale focused image corresponding to the first target focal length 6.44 is assigned to a middle channel of the annotated focused image. In one example context, the middle channel corresponds to a green channel of the annotated focused image, for example where the annotated focused image comprises red, green, and blue color channels.

In some embodiments, the remaining channels of the plurality of channels 602A are assigned based at least in part on a particular determinable offset from the first target focal length. In some embodiments, the offset is predefined, for example as a set number. The offset may be predefined based at least in part on one or more factors affecting object representation measurements within each focused image. For example, in some embodiments, the offset is set based at least in part on imager pixel size, magnification, index of refraction, and/or the like. Alternatively or additionally, in some embodiments, the offset is determined utilizing one or more algorithms, for example based on the number of target focal lengths in the range of target focal lengths, based on one or more algorithms processing the various object representations in the sets of object representations 502, and/or the like. Additionally or alternatively, in some embodiments, the offset is determinable based at least in part on expected object sizes, object representation sizes, object representation size range in one or more image(s), and/or the like. It should be appreciated that the value of the offset may be optimized during training of a model and/or via one or more algorithms separate from training.

In some embodiments, for example as illustrated in FIG. 6A, the offset is set to enable generation of annotated focused images from grayscale focused images associated with sequential target focal lengths. For example, in some embodiments, an offset of 1 indicates that the grayscale focused images associated with target focal points 1 above and/or 1 below the first target focal length should be assigned to a longer and/or shorter channel of the annotated focused image.

As illustrated in the plurality of channels 602A, three total channels may be assigned particular grayscale focused images based at least in part on the first target focal length. For example, in some embodiments, the middle channel (e.g., second channel as depicted) of the annotated focused image may be assigned a first grayscale focused image for the first target focal length determined via a selection algorithm, for example representing selection of the first target focal length representing the target focal length at which the object representation is best in focus (e.g., a best target focal length). Similarly, a shorter channel (e.g., a first channel as depicted) of the annotated focused image may be assigned a second grayscale focused image corresponding to a particular offset shorter than the first target focal length. Using the example offset of 1 as described above, for example, the shorter channel may be assigned a second grayscale focused image corresponding to a second target focal length one step shorter than the first target focal length, specifically corresponding to the target focal length 6.43. Similarly still, a longer channel (e.g., a third channel as depicted) of the annotated focused image may be assigned a third grayscale focused image corresponding to a particular offset longer than the first target focal length. Using the example offset of 1 as described above, for example, the longer channel may be assigned a third grayscale focused image corresponding to a third target focal length one step longer than the first target focal length in the range of target focal lengths, specifically corresponding to the target focal length 6.45.

The plurality of channels 602A enables representation of spatial features related to another dimension of the object representations in the set of object representations 502A (e.g., a depth of the object) based on the changes between such object representations at different target focal lengths. In this regard, such depth features may similarly be learned (e.g., during training of a specially configured model) in addition to the two-dimensional features depicted in each object representation. As such, the annotated focused image generated based at least in part on the plurality of channels 602A may be utilized in learning such features for improved accuracy as compared to merely learning from a grayscale focused image of a single channel individually.

In some embodiments, the annotated focused images generated comprising the first plurality of channels 602A is associated with annotation data that indicates the object identification data corresponding to the particular portion of the grayscale focused images as depicted in the set of object representations 502A. For example, in some embodiments, the annotation data includes at least label data indicating the particular object classification for the object depicted in each of the object representations of the set of object representations 502A. Additionally or alternatively, in some embodiments, the annotation data includes data that indicates a portion of the annotated focused image, and/or each channel thereof, corresponding to the object representation being annotated. For example, in some embodiments, the annotation data includes data embodying a bounding box defining the portion of the focused annotated image corresponding to particular object representation(s) being labelled. Alternatively or additionally, in some embodiments, the annotation data includes data indicating the pixels that are a part of the particular object representation(s) being labelled. Alternatively or additionally still, in some embodiments, the entirety of annotated focused image corresponds to object representation(s) extracted corresponding to one particular object, such that corresponding annotation data represents a label for the entirety of the annotated focused image without defining a particular portion of the image associated therewith.

In some embodiments, additional technical advantages are realized through assigning the plurality of channels for an annotated focused image to each color channel of a plurality of color channels (e.g., RGB channels). For example, in some example contexts, existing machine learning model implementations that enable pattern recognition based on learned features from color images (e.g., specially configured neural network implementations) may be utilized for processing annotated focused images without additional configuration. In this regard, such "off-the-shelf" color image processing implementations may be utilized with reduced additional configuration to provide the advantages described herein.

FIG. 6A further depicts the plurality of channels assigned to annotated focused images generated for the objects corresponding to each of the remaining sets of object representations. The plurality of channels 602B, for example, correspond to a second plurality of channels utilized for generating a second annotated focused image associated with an object represented by the object representations of the set of object representations 502B. In this regard, a first target focal length of 6.40 is determined (e.g., automatically or via user input) for the object representations of the set of object representations 502B, representing the target focal length at which the object corresponding to the set of object representations 502B is determined via a selection algorithm, for example where the object representation is best in focus or otherwise sufficiently in focus. In some such embodiments, the first grayscale focused image corresponding to the target focal length 6.40 may be assigned to a middle channel (e.g., a second channel of three total channels, a green channel in a RGB color channel image, and/or the like). A shorter channel of the plurality of channels 602B (e.g., a first channel of three total channels, a red channel in a RGB color channel image, and/or the like) may further be assigned the grayscale focused image corresponding to the shorter target focal length 6.39 based on an offset of 1 step in a shorter direction from the first target focal length for the set of object representations 502B. Similarly, a longer channel of the plurality of channels 602B (e.g., a third channel of three total channels, a blue channel in a RBG color channel image, and/or the like) may further be assigned the grayscale focused image corresponding to the longer target focal length 6.41 based on an offset of 1 step in a longer direction from the first target focal length for the set of object representations 502B. The second annotated focused image including the plurality of channels 602B assigned to the particular grayscale focused images may be associated with annotation data that indicates the object identification data corresponding to the object representation(s) depicted in the annotated focused image.

This process may continue for any number of annotated focused images and/or any number objects corresponding to one or more object representations captured in a training raw digital holographic microscopy image, for example. As illustrated, the plurality of channels 602C are assigned for an annotated focused image associated with the object corresponding to the set of object representations 502C. In this regard, the first target focal length (e.g., representing a best target focal length for the object representations of the set of object representations 502C) may be determined at target focal length 6.42, and thus assigned as the middle channel with a shorter channel assigned based on target focal length 6.41 and a longer channel assigned based on target focal length 6.43 in accordance with an offset of 1 step. Further as illustrated, the plurality of channels 602D are assigned for an annotated focused image associated with the object corresponding to the set of object representations 502D. In this regard, the first target focal length (e.g., representing a best target focal length for the object representations of the set of object representations 502D) may be determined at target focal length 6.44, and thus assigned as the middle channel with a shorter channel assigned based on target focal length 6.43 and a longer channel assigned based on target focal length 6.45 in accordance with an offset of 1 step. Further as illustrated, the plurality of channels 602E are assigned for an annotated focused image associated with the object corresponding to the set of object representations 502E. In this regard, the first target focal length (e.g., representing a best target focal length of the object representations of the set of object representations 502E) may be determined at target focal length 6.51, and thus assigned as a middle channel with a shorter channel assigned based on target focal length 6.50 and a longer channel assigned based on target focal length 6.52 in accordance with an offset of 1 step. Each of the annotated focused images may additionally be associated with annotation data that corresponds to a particular object classification for the objects represented in the set of object representations 502C, 502D, and 502E respectively.

The plurality of annotated focused images generated comprising each of the plurality of channels 602A, 602B, 602C, 602D, and 602E may be processed to learn the relevant features that indicate a particular object classification indicated by particular object identification data. In some embodiments, multiple annotated focused images are created that each correspond to object representations sharing object identification data. Such annotated focused images may be generated based on multiple object representations in a single training raw digital holographic microscopy image, or from any number of distinct training raw digital holographic microscopy images each including one or more object representations associated with particular object identification data. For example, multiple object representations depicting a single shared particle type (e.g., a mold spore) from one or more training raw digital holographic microscopy images may be processed to generate annotated raw digital holographic microscopy images each annotated with associated annotation data that indicates object identification data representing the single shared particle type (e.g., label data that labels the object representations as a mold sport). In this regard, a training set of annotated focused images may be generated that includes subsets of annotated focused images corresponding to any number of different object identification data (e.g., different object categories, types, and/or the like). A machine learning model, algorithm, and/or statistical model may be trained or otherwise learn, based on the training set of annotated focused images, of the particular spatial features corresponding to each object identification data.

FIG. 6B illustrates another example construction of example focused images including focused grayscale images in a plurality of channels based on a particular offset from a particular target focal length in accordance with at least some example embodiments of the present disclosure. In this regard, the focused images may similarly be generated and associated with annotation data to generate annotated focused images used in learning one or more features indicative of a particular object classification represented by a particular object identification data. For example, the plurality of channels are assigned to particular grayscale focused images based at least in part on an alternative offset.

As illustrated, FIG. 6B indicates grayscale focused images assigned to each of a plurality of channels 652, 654, 656, 658, and 660 corresponding to a set of annotated focused images. As depicted, each of the plurality of channels is assigned based on an offset of 2 steps from a particular first target focal length (e.g., a best target focal length for a particular object representation). The first target focal length may be determined automatically or manually as described herein with respect to FIG. 6A.

In some embodiments, for example, a first annotated focused image is generated including a plurality of channels assigned to the grayscale focused images indicated by the first plurality of channels 652. As illustrated, a middle channel of the first plurality of channels 652 may be assigned the grayscale focused image corresponding to a first target focal length of 6.44, for example embodying a best target focal length for the object corresponding to the set of object representations 502A. A shorter channel of the first plurality of channels 652 (e.g., a first channel, red channel, and/or the like) may be assigned the grayscale focused image corresponding to the target focal length of 6.42 in accordance with an offset of 2 steps. In this regard, the shorter channel is assigned a particular grayscale focused image with a focus simulated as shorted by two times a particular focal distance delta between each target focal lengths within a particular range of target focal lengths. For example, as depicted, with a focal distance delta of 0.01 at each step and a first target focal length of 6.44, an offset of 2 results in assigning the shorter channel to the grayscale focused image associated with a second target focal distance at 6.42. Similarly, a shorter channel of the first plurality of channels 652 (e.g., a third cannel, a blue channel, and/or the like) may be assigned the grayscale focused image corresponding to the target focal length of 6.46 in accordance with an offset of two steps. The annotated focused image generated comprising the plurality of channels 652 may additionally be associated with annotation data that indicates the particular object identification data that labels an object classification associated with the object depicted in the set of object representation 502A.

It should be appreciated that, for other object representations, the first target focal length determined as the best target focal length may differ, and thus the grayscale focused images assigned to each channel may similarly differ. In some such embodiments, the offset remains the same for each annotated focused image being created. For example, as illustrated, a second annotated focused image corresponding to the object representations of the set of object representations 502B may be generated comprising the plurality of channels 654. A first target focal length (e.g., representing a best target focal length for the object representations of the set of object representations 502B) may be determined at a target focal length 6.40. Based on an offset of 2 steps, the shorter channel of the annotated focused image may be assigned a second grayscale focused image at a second target focal length of 6.38 (e.g., two steps of 0.01 shorter than the first target focal length of 6.40 corresponding to the best target focal length). Similarly, the longer channel of the annotated focused image may be assigned a third grayscale focused image at a third target focal length of 6.42 (e.g., two steps of 0.01 longer than the first target focal length of 6.40 corresponding to the best target focal length). The second annotated focused image including the plurality of channels 654 may then be associated with annotation data comprising or otherwise indicating the object identification data that corresponds to an object classification for the object depicted in the object representations of the object representation set 502B.

This process may continue for any number of annotated focused images based on the desired offset (e.g., an offset of two). For example, a third annotated focused image may be generated comprising the plurality of channels 656, specifically with a middle channel assigned a first grayscale focused image at target focal length 6.42 (e.g., where the object representations of the set of object representations 504C are best in focus, in one example embodiment), a shorter channel assigned a second grayscale focused image at target focal length 6.40, and a longer channel assigned a third grayscale focused image at target focal length 6.44. Similarly, a fourth annotated focused image may be generated comprising the plurality of channels 658, specifically with a middle channel assigned a first grayscale focused image at target focal length 6.44, a shorter channel assigned a second grayscale focused image at target focal length 6.42, and a longer channel assigned a third grayscale focused image at a target focal length 6.46. Further still, a fifth annotated focused image may be generated comprising the plurality of channels 560, specifically with a middle channel assigned a first grayscale focused image at target focal length 6.52, a shorter channel assigned a second grayscale focused image at target focal length 6.50, and a longer channel assigned a third grayscale focused image at a target focal length 6.54. Each of these annotated focused images may be associated with annotation data that corresponds to the object identification corresponding to the object classification for the depicted objects.

By expanding the offset between the channels, the resulting annotated focused images are generated with wider changes in depth. Such changes in depth may be used to learn alternative spatial features utilized in identifying object identification data corresponding to particular object representations. It should be appreciated that in other embodiments, the offset may be defined in any of a myriad of ways. For example, in some embodiments, the offset is defined as a particular change in target focal length to be used in determining one or more longer and/or shorter channels. In one example context, an offset of 0.01 may be set to represent that a shorter channel should be assigned a grayscale focused image corresponding to a target focal length 0.01 units (e.g., mm) shorter than a first target focal length, such as a best target focal length, and a longer channel should be assigned a grayscale focused image corresponding to a target focal length 0.01 units (e.g., mm) longer than the first target focal length. It should similarly be appreciated that, in some embodiments, the offset may be defined as different values for assigning the shorter channel as compared to assigning the longer channel. For example, in some embodiments, a shorter channel may be based on a first offset defined as a first value (e.g., 1 step, or a particular change in target focal length), and a longer channel may be assigned based on a second offset defined as a second value different from the first value (e.g., 2 steps, or double the particular change in target focal length for the shorter channel).

This process may continue for any number of annotated focused images and/or any number objects corresponding to one or more object representations captured in a training raw digital holographic microscopy image, for example. As illustrated, the plurality of channels 602C are assigned for an annotated focused image associated with the object corresponding to the set of object representations 502C. In this regard, the first target focal length (e.g., representing a best target focal length for the object representations of the set of object representations 502C) may be determined at target focal length 6.42, and thus assigned as the middle channel with a shorter channel assigned based on target focal length 6.41 and a longer channel assigned based on target focal length 6.43 in accordance with an offset of 1 step. Further as illustrated, the plurality of channels 602D are assigned for an annotated focused image associated with the object corresponding to the set of object representations 502D. In this regard, the first target focal length (e.g., representing a best target focal length for the object representations of the set of object representations 502D) may be determined at target focal length 6.44, and thus assigned as the middle channel with a shorter channel assigned based on target focal length 6.43 and a longer channel assigned based on target focal length 6.45 in accordance with an offset of 1 step. Further as illustrated, the plurality of channels 602E are assigned for an annotated focused image associated with the object corresponding to the set of object representations 502E. In this regard, the first target focal length (e.g., representing a best target focal length of the object representations of the set of object representations 502E) may be determined at target focal length 6.51, and thus assigned as a middle channel with a shorter channel assigned based on target focal length 6.50 and a longer channel assigned based on target focal length 6.52 in accordance with an offset of 1 step. Each of the annotated focused images may additionally be associated with annotation data that corresponds to a particular object classification for the objects represented in the set of object representations 502C, 502D, and 502E respectively.

FIG. 7 illustrates an example representation of specialized model training and deployment in accordance with at least some example embodiments of the present disclosure. In this regard, model(s), algorithm(s), and/or the like may be trained based at least in part on the image configurations described herein. For example, in some embodiments, the model is trained based on annotated focused images generated and/or otherwise configured as described herein, for example with respect to FIGS. 6A and/or 6B.

As illustrated, the model 754 is trained based at least in part on a training annotated focused image set 752. In some embodiments, the training annotated focused image set 752 may include any number of annotated focused images. Each annotated focused image may have a particular number of channels, each channel assigned a particular grayscale focused image as described herein. For example, in some embodiments, the number of channels for each annotated focused image of the training annotated focused image set 752 corresponds to a number of channels processable as input by the model 754. For example, in some embodiments, the model 754 embodies a particular neural network, artificial intelligence, or other machine learning model is configured to process RGB color images, and each annotated focused image of the training annotated focused image set 752 may similarly include three channels corresponding to the red, green, and blue color channels. In other embodiments, such as where alternative model implementations of the model 754 are utilized, each annotated focused image of the training annotated focused image set 752 may include an alternative number of channels corresponding to the alternative model implementation.

During training, the model 754 learns spatial features from each of the annotated focused images of the training annotated focused image set 752. For example, each training annotated focused image of the training annotated focused image set 752 may include and/or otherwise be associated with one or more particular object representation(s), as well as annotation data that indicates the object identification data corresponding to an object classification for the object representation(s). In this regard, the model 754 may configure one or more parameters and/or hyperparameters based on the features of each object representation to learn the patterns indicating an object representation corresponds a particular object classification indicated by particular object identification data. As each annotated focused image of the training annotated focused image set 752 is processed by the model 754, the model 754 is further configured, resulting in the trained model 756. In this regard, the trained model 756 may be configured utilized to process grayscale focused images and output predicted object identification data, and/or probabilities of particular object identification data, corresponding to object representations within the inputted images.

In some embodiments, the model 754 is trained and/or learns from additional and/or alternative features associated with object representations in the annotated focused images. For example, in some embodiments, the location of a particular object representation within the image is relevant for training purposes, such as object representations closer to the edge of the image are likely to be less in focus. Accordingly, the location information for object representation(s) may be utilized to select particular data for use in training the model 754.

In one example context, for example as illustrated, the trained model 756 receives as input grayscale focused image(s) 758 for processing. For example, the trained model 756 may process the grayscale focused image(s) 758 to generate and output object identification data 760 corresponding to one or more object representations within the grayscale focused image(s) 758. In this regard, the trained model 756 may generate the object identification data 760 corresponding to the object representations in the grayscale focused image(s) 758 based on the spatial features learned from the training annotated focused image set 752 during training.

In some embodiments, the trained model 756 generates multi-channel focused images from the grayscale focused image(s) 758, and processes the multi-channel focused images to generate and/or output the corresponding object identification data 760 for object representations within the multi-channel focused image(s). Additionally or alternatively, in some embodiments, the trained model 756 generates the grayscale focused image(s) 758 from one or more raw digital holographic microscopy image(s) for processing. For example, the trained model 756 may pre-process the raw digital holographic microscopy image by applying one or more spectral propagation algorithm(s) to a received raw digital holographic microscopy image to generate the grayscale focused image(s) 758 for further processing.

Example Processes of the Disclosure

Having described example systems, apparatuses, images, and training methodologies of the disclosure, example processes in accordance with the present disclosure will now be described. It will be appreciated that each of the flowcharts depicts an example computer-implemented process that may be performed by one or more of the apparatuses, systems, devices, and/or computer program products described herein, for example utilizing one or more of the specially configured components thereof.

The blocks depicted indicate operations of each process. Such operations may be in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes may include some or all operational steps described and/or depicted, including one or more optional blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 8 illustrates a flowchart depicting example operations of an example process for generating improved object identification for object representation(s) in a raw digital holographic microscopy image in accordance with at least some example embodiments of the present disclosure. Specifically, FIG. 8 illustrates operations of an example process 800. In some embodiments, the process 800 is embodied by computer program code stored on a non-transitory computer-readable storage medium of a computer program product configured for execution to perform the process as depicted and described. Alternatively or additionally, in some embodiments, the process 800 is performed by one or more specially configured computing devices, such as the hologram processing apparatus 200 alone or in communication with one or more other component(s), device(s), system(s), and/or the like. In this regard, in some such embodiments, the hologram processing apparatus 200 is specially configured by computer-coded instructions (e.g., computer program instructions) stored thereon, for example in the memory 204 and/or another component depicted and/or described herein and/or otherwise accessible to the hologram processing apparatus 200, for performing the operations as depicted and described. In some embodiments, the hologram processing apparatus 200 is in communication with one or more external apparatus(es), system(s), device(s), and/or the like, to perform one or more of the operations as depicted and described. For example, the hologram processing apparatus 200 may be in communication with a sample capture apparatus (e.g., embodied by the lens-less holography apparatus 300 or a lens-based holography apparatus). For purposes of simplifying the description, the process 800 is described as performed by and from the perspective of the hologram processing apparatus 200.

The process 800 begins at operation 802. At operation 802, the hologram processing apparatus 200 includes means, such as the comparison learning circuitry 212, hologram processing circuitry 210, the communications circuitry 208, the input/output circuitry 206, the processor 202, and/or the like, or a combination thereof, to generate a grayscale focused image set corresponding to a raw digital holographic microscopy image comprising at least one captured object representation. In some embodiments, each grayscale focused image in the grayscale focused image set is focused at a different target focal length of a range of target focal lengths. For example, the range of target focal lengths may include target focal lengths separated by a predefined delta (e.g., 0.01 size steps). Alternatively or additionally, in some embodiments, the range of target focal lengths embodies a set of particular target focal lengths for simulating, each of which may be separated by any delta. In some embodiments, the range of target focal lengths is predefined based on a minimum target focal length, a maximum target focal length, and a target focal length delta between each step. For example, the range of target focal lengths may correspond to a predetermined range of target focal lengths at which objects are expected to be captured.

At operation 804, the hologram processing apparatus 200 includes means, such as the comparison learning circuitry 212, hologram processing circuitry 210, the communications circuitry 208, the input/output circuitry 206, the processor 202, and/or the like, or a combination thereof, to generate at least one object identification data by comparing the grayscale focused image set to a plurality of annotated focused images associated with a training raw digital holographic microscopy image, or a plurality of training raw digital holographic microscopy images. The training raw digital holographic microscopy images may be previously stored, received from one or more sample capture apparatus(es). In some embodiments, each of the plurality of annotated focused images comprises a plurality of channels. For example, the plurality of channels may correspond to image channels for a particular image encoding (e.g., RGB color channels, RGBA color channels, and/or the like). In other embodiments, the annotated focused images are configured to include any number of channels. Each channel may be assigned a particular grayscale focused image associated with a different target focal length. In some embodiments, for example, each annotated focused image is generate as depicted and described with respect to FIG. 11.

Additionally or alternatively, in some embodiments, each channel of the plurality of channels comprises a grayscale image focused at a different target focal length of the range of target focal lengths. For example, in some embodiments, the plurality of channels includes a middle channel, a shorter channel, and a longer channel. In some embodiments, the middle channel corresponds to a green channel of RGB color channels, the shorter channel corresponds to a red channel of RGB color channels, and the longer channel corresponds to a blue channel of RGB color channels.

In some embodiments, the comparison is performed by a specially trained model. For example, in some embodiments, the hologram processing apparatus 200 processes a raw digital holographic microscopy image utilizing a specially trained model to output object identification data. In some embodiments, the model is specially trained based at least in part on the annotated focused images described herein. In this regard, the model may learn the spatial features corresponding to particular object identification data based on spatial features represented in the plurality of channels from annotated focused images including or associated with annotation data that indicates the particular object identification data. In some embodiments, for example, the model is embodied by a specially configured neural network, artificial intelligence model, and/or other machine learning model trained on the plurality of annotated focused images to perform pattern recognition with respect to a set of possible object identification data (e.g., representing possible object classifications). In this regard, the specially trained model may take as input the raw digital holographic microscopy image, the grayscale focused image set generated therefrom, and/or focused images generated therefrom and in response output object identification data representing a determined and/or most likely object identification data. Additionally or alternatively, in some embodiments the model is trained to take as input grayscale focused images generated from a raw digital holographic microscopy image to generate object identification data represented in the grayscale focused image. Additionally or alternatively still, in some embodiments, the model is trained to take as input focused images comprising a plurality of channels each including a grayscale focused image, and generates the object identification data represented in the focused image. In yet other embodiments, other comparison algorithms are specially configured to perform the comparison between the grayscale focused image set and the plurality of annotated focused images.

At operation 806, the hologram processing apparatus 200 includes means, such as the comparison learning circuitry 212, hologram processing circuitry 210, the communications circuitry 208, the input/output circuitry 206, the processor 202, and/or the like, or a combination thereof, to output the at least one object identification data. In some embodiments, the at least one object identification data embodies a particular object classification associated with a particular object representation depicted in the raw digital holographic microscopy image, and/or object classification/categories associated with one or more object representations depicted in the raw digital holographic microscopy image. Alternatively or additionally, in some embodiments, the at least one object identification data embodies probabilities that a particular object representation corresponds to each category of a set of possible object categories.

In some embodiments, the hologram processing apparatus 200 outputs the at least one object identification data via one or more displays of or associated with the hologram processing apparatus 200. For example, the hologram processing apparatus 200 may output the at least one object identification data via rendering a particular user interface including or based on the at least one object identification data. In some such embodiments, the rendered user interface may indicate the object classifications for such object representations within the raw digital holographic microscopy image, a determination of whether one or more particular object categories corresponding to particular object identification data was identified, and/or the like. Alternatively or additionally, in some embodiments, the hologram processing apparatus 200 outputs the at least one object identification data by transmitting the at least one object identification data to another system, device, and/or the like for further processing and/or display.

FIG. 9 illustrates a flowchart depicting example operations of an example process for generating a grayscale focused image set in accordance with at least some example embodiments of the present disclosure. Specifically, FIG. 9 depicts operations of an example process 900. In some embodiments, the process 900 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the hologram processing apparatus 200. Such computing devices may perform the operations of the described processes alone or in communication with one or more other component(s), device(s), system(s), and/or the like. In this regard, in some such embodiments, the computing device(s) is/are specially configured by computer-coded instructions (e.g., computer program instructions) stored thereon, for example in a memory and/or another component depicted and/or described herein and/or otherwise accessible to the computing device(s), for performing the operations as depicted and described. In some embodiments, the computing device(s) is/are in communication with one or more external apparatus (es), system(s), device(s), and/or the like, to perform one or more of the operations as depicted and described. For purposes of simplifying the description, the process 900 is described as performed by and from the perspective of the hologram processing apparatus 200.

The process 900 begins at operation 902. In some embodiments, the process 900 begins after one or more operations depicted and/or described with respect to any of the other processes described herein. In this regard, some or all of the process 900 may replace or supplement one or more blocks depicted and/or described with respect to any of the other processes described herein. Upon completion of the process 900, the flow of operations may terminate. Additionally or alternatively, as depicted, upon completion of the process 900, flow may return to one or more operations of another process, for example to the operation 804 as depicted. It should be appreciated that, in some embodiments, the process 900 embodies a subprocess of one or more other process(es), such as the process 800.

At operation 902, the hologram processing apparatus 200 includes means, such as the comparison learning circuitry 212, hologram processing circuitry 210, the communications circuitry 208, the input/output circuitry 206, the processor 202, and/or the like, or a combination thereof, to receive a raw digital holographic microscopy image. In some embodiments, the raw digital holographic microscopy image is received from a sample capture apparatus. In some embodiments, the raw digital holographic microscopy image is received in real-time (or near-real-time, for example within seconds) after activation of the sample capture apparatus for capturing said raw digital holographic microscopy image for processing. In one example context, the sample capture apparatus may embody an air sampling device that intakes air sample(s) and captures raw digital holographic microscopy images of objects caught from such air sample (s) in a capture medium. The raw digital holographic microscopy image may be received over one or more communications networks, for example via a wired connection or a wireless connection with the sample capture apparatus embodied by the lens-less holography apparatus 300. Alternatively or additionally, in some embodiments, the hologram processing apparatus 200 receives the raw digital holographic microscopy image from a raw digital holographic microscopy image repository maintained by the hologram processing apparatus 200.

At operation 904, the hologram processing apparatus 200 includes means, such as the comparison learning circuitry 212, hologram processing circuitry 210, the communications circuitry 208, the input/output circuitry 206, the processor 202, and/or the like, or a combination thereof, to apply a spectral propagation algorithm over a range of target focal lengths. In some embodiments, hologram processing apparatus 200 applies the spectral propagation algorithm to the raw digital holographic microscopy image over the range of target focal lengths. In this regard, the spectral propagation algorithm may simulate the raw digital holographic microscopy image focused at the particular target focal length from the range of target focal lengths. The spectral propagation algorithm may be executed for each target focal length in the range of target focal lengths. Each application of the spectral propagation algorithm may generate a corresponding grayscale focused image focused at a particular corresponding target focal length. Accordingly, the hologram processing apparatus 200 may generate a grayscale focused image set including a grayscale focused image focused at each target focal length within the range of target focal length.

FIG. 10 illustrates a flowchart depicting example operations of an example process for training a model based at least in part on a plurality of annotated focused images in accordance with at least some example embodiments of the present disclosure. Specifically, FIG. 10 depicts operations of an example process 1000. In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the hologram processing apparatus 200. Such computing devices may perform the operations of the described processes alone or in communication with one or more other component(s), device(s), system(s), and/or the like. In this regard, in some such embodiments, the computing device(s) is/are specially configured by computer-coded instructions (e.g., computer program instructions) stored thereon, for example in a memory and/or another component depicted and/or described herein and/or otherwise accessible to the computing device(s), for performing the operations as depicted and described. In some embodiments, the computing device(s) is/are in communication with one or more external apparatus(es), system(s), device(s), and/or the like, to perform one or more of the operations as depicted and described. For purposes of simplifying the description, the process 1000 is described as performed by and from the perspective of the hologram processing apparatus 200.

The process 1000 begins at operation 1002. In some embodiments, the process 1000 begins after one or more operations depicted and/or described with respect to any of the other processes described herein. In this regard, some or all of the process 1000 may replace or supplement one or more blocks depicted and/or described with respect to any of the other processes described herein. Upon completion of the process 1000, the flow of operations may terminate. Additionally or alternatively, as depicted, upon completion of the process 1000, flow may return to one or more operations of another process, for example to the operation 802 as depicted. It should be appreciated that, in some embodiments, the process 1000 embodies a subprocess of one or more other process(es), such as the process 800.

At operation 1002, the hologram processing apparatus 200 includes means, such as the comparison learning circuitry 212, hologram processing circuitry 210, the communications circuitry 208, the input/output circuitry 206, the processor 202, and/or the like, or a combination thereof, to train a model based at least in part on a plurality of annotated focused images. In some embodiments, the plurality of annotated focused images include a plurality of channels assigned particular grayscale focused images. For example, as described herein, the plurality of channels includes a middle channel assigned with a particular grayscale focused image associated with a first target focal length within which object representation(s) are determined via a selection algorithm (e.g., selecting an object representation that satisfies a particular focus threshold, is best in focus, and/or the like), and a shorter channel and longer channel assigned based on a particular offset and the first target focal length. It should be appreciated that, during training, one or more parameters and/or hyperparameters of the model may be specifically configured based on the features of particular object representations in the annotated focused image(s) annotated with annotation data indicating an associated with particular object identification data. In this regard, through such training, the model may learn pattern recognition to process the data representations in a subsequently captured raw digital holographic microscopy image and generate object identification data embodying a most likely object classification based on such learned features corresponding to such object identification data.

FIG. 11 illustrates a flowchart depicting example operations of an example process for generating one or more annotated focused image in accordance with at least some example embodiments of the present disclosure. Specifically, FIG. 11 depicts operations of an example process 1100. In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the hologram processing apparatus 200. Such computing devices may perform the operations of the described processes alone or in communication with one or more other component(s), device(s), system(s), and/or the like. In this regard, in some such embodiments, the computing device(s) is/are specially configured by computer-coded instructions (e.g., computer program instructions) stored thereon, for example in a memory and/or another component depicted and/or described herein and/or otherwise accessible to the computing device(s), for performing the operations as depicted and described. In some embodiments, the computing device(s) is/are in communication with one or more external apparatus(es), system(s), device(s), and/or the like, to perform one or more of the operations as depicted and described. For purposes of simplifying the description, the process 1100 is described as performed by and from the perspective of the hologram processing apparatus 200.

The process 1100 begins at operation 1102. In some embodiments, the process 1100 begins after one or more operations depicted and/or described with respect to any of the other processes described herein. In this regard, some or all of the process 1100 may replace or supplement one or more blocks depicted and/or described with respect to any of the other processes described herein. Upon completion of the process 1100, the flow of operations may terminate. Additionally or alternatively, as depicted, upon completion of the process 1100, flow may return to one or more operations of another process, for example to the operation 802 as depicted. It should be appreciated that, in some embodiments, the process 1100 embodies a subprocess of one or more other process(es), such as the process 800.

At operation 1102, the hologram processing apparatus 200 includes means, such as the comparison learning circuitry 212, hologram processing circuitry 210, the communications circuitry 208, the input/output circuitry 206, the processor 202, and/or the like, or a combination thereof, to receive a set of training grayscale focused images. In some embodiments, the set of training grayscale focused images is received from one or more repositories storing training grayscale focused images. Alternatively or additionally, in some embodiments to receive the set of training grayscale focused images, the hologram processing apparatus 200 receives one or more training raw digital holographic microscopy images and utilizes one or more spectral propagation algorithms to generate the set of training grayscale focused images based on the set of training grayscale focused images.

The set of training grayscale focused images may include grayscale focused images at various target focal lengths in a range of target focal lengths corresponding to a particular training raw digital holographic microscopy image. In some embodiments, the set of training grayscale focused images includes multiple subsets of training grayscale focused images, each subset corresponding to a particular training raw digital holographic microscopy image of a set of training raw focused images. For example, the set of training grayscale focused images (and/or each subset thereof) may include a grayscale focused image with simulated focus at each target focal length represented in a range of target focal lengths, with each target focal length separated by a particular target focal length delta.

In some embodiments, the hologram processing apparatus 200 generates and/or configures annotated focused image(s) for each object representation in each of the set of training grayscale focused images, and/or each object representation in the training raw digital holographic microscopy image(s) associated therewith. For example, in some embodiments, the hologram processing apparatus 200 identifies object representation(s) from within such image(s) automatically, or based on user input indicating the portion(s) of such images corresponding to particular object representation(s). As illustrated, annotated focused images may be generated and/or configured for each object representation in a particular object representation set, or for each identified object representation in each raw digital holographic microscopy image and/or training grayscale focused image of the set of training grayscale focused images. At operation 1104, for example, the hologram processing apparatus 200 includes means, such as the comparison learning circuitry 212, hologram processing circuitry 210, the communications circuitry 208, the input/output circuitry 206, the processor 202, and/or the like, or a combination thereof, to determine whether a next particular object representation remains unprocessed. In circumstances where an unprocessed particular object representation is identified, flow proceeds to operation 1106. In circumstances where no unprocessed particular object representation is identified (e.g., all particular object representations have been processed), flow proceeds to the end of process 1100.

At operation 1106, for example, the hologram processing apparatus 200 includes means, such as the comparison learning circuitry 212, hologram processing circuitry 210, the communications circuitry 208, the input/output circuitry 206, the processor 202, and/or the like, or a combination thereof, to assign a middle channel of a focused image to a first training grayscale focused image of a set of training grayscale focused images. In some embodiments, the first training grayscale focused image corresponds to a first target focal length for the particular object representation, such as where first target focal length corresponds to a best target focal length at which the particular object representation is depicted best in focus. Alternatively or additionally, in some embodiments, the first training grayscale focused image corresponds to a first target focal length determined via a selection algorithm, for example corresponding to selection via any other data-driven determination. It should be appreciated that the first target focal length may be determined automatically by the hologram processing apparatus 200 (e.g., utilizing one or more image processing algorithm(s)), and/or in response to manual input (e.g., by users of the hologram processing apparatus 200, subject matter experts for particular object classifications depicted in the object representation, and/or the like). It will be appreciated that the best target focal length may not correspond to the target focal length at which the raw digital holographic microscopy image was captured.

At operation 1108, for example, the hologram processing apparatus 200 includes means, such as the comparison learning circuitry 212, hologram processing circuitry 210, the communications circuitry 208, the input/output circuitry 206, the processor 202, and/or the like, or a combination thereof, to assign a shorter channel of the focused image to a second training grayscale image of the set of training grayscale focused images. In some embodiments, the shorter channel comprises a second grayscale focused image corresponding to a second target focal length of a range of target focal lengths. In some embodiments, the second target focal length is shorter than the first target focal length. In this regard, the second target focal length may be offset from the first target focal length by a particular offset in a first particular direction (e.g., towards shorter target focal lengths). In some such embodiments, the offset is defined by a particular number of predefined size steps (e.g., 1 step of 0.01 shorter from the first target focal length, 2 steps of 0.01 shorter from the first target focal length, and/or the like) or by a particular delta of target focal length (e.g., a decrease by 0.03 shorter from the first target focal length).

At operation 1110, for example, the hologram processing apparatus 200 includes means, such as the comparison learning circuitry 212, hologram processing circuitry 210, the communications circuitry 208, the input/output circuitry 206, the processor 202, and/or the like, or a combination thereof, to assign a longer channel of the focused image to a third training grayscale focused image of the set of training grayscale focused images. In some embodiments, the longer channel comprises a third grayscale focused image corresponding to a third target focal length of the range of target focal lengths. In some embodiments, the third target focal length is longer than the third target focal length. In this regard, the third target focal length may be offset from the first target focal length by a particular offset in a second direction (e.g., towards longer target focal lengths). In some such embodiments, the offset is the same as the offset for assigning the shorter channel. Alternatively or additionally, in some embodiments, the offset is different from the offset for assigning the shorter channel.

At operation 1112, for example, the hologram processing apparatus 200 includes means, such as the comparison learning circuitry 212, hologram processing circuitry 210, the communications circuitry 208, the input/output circuitry 206, the processor 202, and/or the like, or a combination thereof, to associate the focused image with particular annotation data for the particular object representation. In some such embodiments, the particular annotation data corresponds to a particular object classification associated with the object representation. The annotation data may identify one or more object representations in some or all of the channels of the focused image (e.g., embodying an annotated focused image for use in training one or more models, configuring one or more algorithms, and/or the like). In some embodiments, for example, the annotation data embodies or includes object identification data that represents the object classification of the object representation(s) in the focused image, grayscale focused images in channels thereof, and/or in the training raw digital holographic microscopy image utilized to generate the grayscale focused images assigned to the focused image embodying an annotated focused image.

FIG. 12 illustrates a flowchart depicting example operations of an example process for training a model based on training, test, and validation subsets of annotated focused images in accordance with at least some example embodiments of the present disclosure. Specifically, FIG. 12 depicts operations of an example process 1200. In some embodiments, the process 1200 is embodied by computer program code stored on a non-transitory computer-readable storage medium of a computer program product configured for execution to perform the process as depicted and described. Alternatively or additionally, in some embodiments, the process 1200 is performed by one or more specially configured computing devices, such as the hologram processing apparatus 200. Such computing devices may perform the operations of the described processes alone or in communication with one or more other component(s), device(s), system(s), and/or the like. In this regard, in some such embodiments, the computing device(s) is/are specially configured by computer-coded instructions (e.g., computer program instructions) stored thereon, for example in a memory and/or another component depicted and/or described herein and/or otherwise accessible to the computing device(s), for performing the operations as depicted and described. In some embodiments, the computing device(s) is/are in communication with one or more external apparatus(es), system(s), device(s), and/or the like, to perform one or more of the operations as depicted and described. For purposes of simplifying the description, the process 1200 is described as performed by and from the perspective of the hologram processing apparatus 200.

The process 1200 begins at operation 1202. In some embodiments, the process 1100 begins after one or more operations depicted and/or described with respect to any of the other processes described herein. In this regard, some or all of the process 1200 may replace or supplement one or more blocks depicted and/or described with respect to any of the other processes described herein. Upon completion of the process 1200, the flow of operations may terminate. Additionally or alternatively, as depicted, upon completion of the process 1200, flow may return to one or more operations of another process, for example to the operation 802 as depicted. It should be appreciated that, in some embodiments, the process 1200 embodies a subprocess of one or more other process(es), such as the process 800.

At operation 1202, the hologram processing apparatus 200 includes means, such as the comparison learning circuitry 212, hologram processing circuitry 210, the communications circuitry 208, the input/output circuitry 206, the processor 202, and/or the like, or a combination thereof, to generate, from a plurality of annotated focused images, a test subset of annotated focused images, a training subset of annotated focused images, and a validation subset of annotated focused images. In some embodiments, the hologram processing apparatus 200 equally divides the plurality of annotated focused images to generate the training subset, test subset, and validation subset of annotated focused images. Alternatively, in some embodiments, the hologram processing apparatus 200 generates a plurality of combinations of test subsets, training subsets, and/or validation subsets for processing. In this regard, the combination of subsets that results in the most accurate model may be utilized for further processing.

At operation 1204, the hologram processing apparatus 200 includes means, such as the comparison learning circuitry 212, hologram processing circuitry 210, the communications circuitry 208, the input/output circuitry 206, the processor 202, and/or the like, or a combination thereof, to train a model based at least in part on the test subset of annotated focused images, the training subset of annotated focused images, and the validation subset of annotated focused images. In some embodiments, the model is trained to learn spatial features of the object representations included in the training subset of annotated focused images, and the object identification data indicating object classifications associated therewith. Additionally or alternatively, in some embodiments, the hologram processing apparatus 200 utilizes the validation subset of annotated focused images during training to determine whether the model is improving in accuracy during training. Additionally or alternatively still, in some embodiments, the hologram processing apparatus 200 utilizes the test subset of annotated focused images to determine whether the model meets a desired accuracy threshold upon completion of training utilizing the training subset of annotated focused images.

In some embodiments, the training process is repeated for any number of models based on various combinations of training subsets, validation subsets, and test subsets. In some such embodiments, the trained models may be compared based on one or more parameters, and a particular trained model is selected based at least in part on such a comparison. For example, trained models may be compared based on an accuracy metric of each model, and the model with the highest accuracy metric may be selected and/or stored for subsequent use (e.g., for processing subsequently received raw digital holographic microscopy images).

FIG. 13 illustrates a flowchart depicting example operations of retrieving a raw digital holographic microscopy image in accordance with at least some example embodiments of the present disclosure. Specifically, FIG. 13 depicts operations of an example process 1300. In some embodiments, the process 1300 is embodied by computer program code stored on a non-transitory computer-readable storage medium of a computer program product configured for execution to perform the process as depicted and described. Alternatively or additionally, in some embodiments, the process 1300 is performed by one or more specially configured computing devices, such as the hologram processing apparatus 200. Such computing devices may perform the operations of the described processes alone or in communication with one or more other component(s), device(s), system(s), and/or the like. In this regard, in some such embodiments, the computing device(s) is/are specially configured by computer-coded instructions (e.g., computer program instructions) stored thereon, for example in a memory and/or another component depicted and/or described herein and/or otherwise accessible to the computing device(s), for performing the operations as depicted and described. In some embodiments, the computing device(s) is/are in communication with one or more external apparatus(es), system(s), device(s), and/or the like, to perform one or more of the operations as depicted and described. For purposes of simplifying the description, the process 1300 is described as performed by and from the perspective of the hologram processing apparatus 200.

The process 1300 begins at operation 1302 or operation 1304. It should be appreciated that, in some embodiments, the starting operation is dependent on the particular implementation of the hologram processing apparatus 200. For example, in some embodiments, the hologram processing apparatus 200 is communicable with an external device that captures and transmits raw digital holographic microscopy images, such as a sample capture apparatus, and the process begins at operation 1302. Alternatively or additionally, in some embodiments, the hologram processing apparatus 200 includes or embodies a sample capture apparatus and/or particular hardware, software, and/or firmware that enables capture of a raw digital holographic microscopy image, and the process begins at operation 1304. In yet some other embodiments, the hologram processing apparatus 200 may begin at either the operation 1302 or 1304, for example based on whether input was received to capture a raw digital holographic microscopy image or whether a raw digital holographic microscopy image was received via one or more data transmissions.

In some embodiments, the process 1300 begins after one or more operations depicted and/or described with respect to any of the other processes described herein. In this regard, some or all of the process 1300 may replace or supplement one or more blocks depicted and/or described with respect to any of the other processes described herein. Upon completion of the process 1300, the flow of operations may terminate. Additionally or alternatively, as depicted, upon completion of the process 1300, flow may return to one or more operations of another process, for example to the operation 802 as depicted. It should be appreciated that, in some embodiments, the process 1300 embodies a subprocess of one or more other process(es), such as the process 800.

At operation 1302, the hologram processing apparatus 200 includes means, such as the comparison learning circuitry 212, hologram processing circuitry 210, the communications circuitry 208, the input/output circuitry 206, the processor 202, and/or the like, or a combination thereof, to receive a raw digital holographic microscopy image captured via sample capture apparatus. In some embodiments, the sample capture apparatus is embodied by a lens-less holography apparatus. For example, in some embodiments, the lens-less holography apparatus is embodied by one or more computing devices external to the hologram processing apparatus 200. The lens-less holography apparatus may transmit a raw digital holographic microscopy image received by the hologram processing apparatus 200 in response to initiation of a process on the lens-less holography apparatus for capturing and analyzing a particular sample, for example an air sample. In this regard, it will be appreciated that the hologram processing apparatus 200 may receive the raw digital holographic microscopy image via one or more long-range or short-range communications networks establishing a connection between the hologram processing apparatus 200 and the lens-less holography apparatus. In some such embodiments, upon receiving the raw digital holographic microscopy image, the raw digital holographic microscopy image is processed to generate and/or output object identification data associated with data representations depicted in the raw digital holographic microscopy image, as described herein with respect to the process 800 for example. In some other embodiments, the sample capture apparatus is received from a lens-based capture apparatus.

At operation 1304, the hologram processing apparatus 200 includes means, such as the comparison learning circuitry 212, hologram processing circuitry 210, the communications circuitry 208, the input/output circuitry 206, the processor 202, and/or the like, or a combination thereof, to capture a raw digital holographic microscopy image via an image sensor. In some embodiments, the hologram processing apparatus 200 initiates capture of a raw digital holographic microscopy image via an image sensor in response to a signal received in response to a particular user input, for example engaging a particular button, touch area, or other input to initiate a process for intaking a sample and capturing a raw digital holographic microscopy image associated therewith. In some embodiments, to capture the raw digital holographic microscopy image via the image sensor, the hologram processing apparatus 200 activates one or more components for intaking an air sample and trapping objects from the air sample in a capture medium, for example one or more air pumps and/or exhausts. Additionally or alternatively, in some embodiments, the hologram processing apparatus 200 activates one or more components for projecting light rays through the capture medium, and activates the image sensor to capture the raw digital holographic microscopy image based on the intensity of the light rays projected through the capture medium that interacts with the image sensor.

Conclusion

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
one or more processors;
a memory including computer program code stored thereon that, in execution with the one or more processors, cause the system to:
generate a grayscale focused image set corresponding to a raw digital holographic microscopy image comprising at least one captured object representation, each grayscale focused image in the grayscale focused image set focused at a different target focal length of a range of target focal lengths;
generate at least one object identification data by comparing the grayscale focused image set to a plurality of annotated focused images associated with a training raw digital holographic microscopy image, each of the plurality of annotated focused images comprising a plurality of channels, wherein the plurality of channels for each annotated focused image of the plurality of annotated focused images comprises:
a middle channel comprising a first grayscale focused image corresponding to a first target focal length of the range of target focal lengths, the first target focal length at which a selected object representation within at least the training raw digital holographic microscopy image is determined via a selection algorithm;
a shorter channel comprising a second grayscale focused image corresponding to a second target focal length of the range of target focal lengths, wherein the second target focal length is shorter than the first target focal length; and
a longer channel comprising a third grayscale focused image corresponding to a third target focal length of the range of target focal lengths, wherein the third target focal length is longer than the first target focal length,
wherein each particular annotated focused image of the plurality of annotated focused images is associated with annotation data that identifies one or more object representations in each channel of the particular annotated focused image; and
output the at least one object identification data.

2. The system according to claim 1, wherein to generate the grayscale focused image set, the computer program code causes the system to apply a spectral propagation algorithm to the raw digital holographic microscopy image over the range of target focal lengths.

3. The system according to claim 1, wherein to generate the at least one object identification data, the computer program code causes the system to:
process the grayscale focused image set utilizing a model trained based on the plurality of annotated focused images associated with at least the training raw digital holographic microscopy image.

4. The system according to claim 3, the system further caused to:
train the model based at least in part on the plurality of annotated focused images.

5. The system according to claim 3, the system further caused to:
generate the plurality of annotated focused images by:
receiving a set of training grayscale focused images;
for each particular object representation of a set of object representations in the training raw digital holographic microscopy image, generating a focused image by:
assigning the middle channel of the focused image to a first training grayscale focused image of the set of training grayscale focused images corresponding to a determined first target focal length for the particular object representation of the range of target focal lengths, the determined first target focal length at which the particular object representation within at least the training raw digital holographic microscopy image is determined via the selection algorithm;
assigning the shorter channel of the focused image to a second training grayscale focused image of the set of training grayscale focused images corresponding to a determined second target focal length for the particular object representation, the determined second target focal length based at least in part on an offset from the determined first target focal length for the particular object representation in a first direction; and
assigning the longer channel of the focused image to a third training grayscale focused image of the set of training grayscale focused images corresponding to a determined third target focal length for the particular object representation, the determined third target focal length based at least in part on the offset from the determined first target focal length for the particular object representation in a second direction; and
associating the focused image with particular annotation data for the particular object representation.

6. The system according to claim 5, wherein the particular annotation data for the particular object representation indicates a boundary of the particular object representation within the focused image.

7. The system according to claim 5, the system further caused to:
generate, from the plurality of annotated focused images, a test subset of annotated focused images, a training subset of annotated focused images, and a validation subset of annotated focused images, wherein the model is trained based at least in part on the test subset of annotated focused images, the training subset of annotated focused images, and the validation subset of annotated focused images.

8. The system according to claim 1, wherein the plurality of channels comprises a red channel, a green channel, and a blue channel.

9. The system according to claim 8, wherein the green channel corresponds to the middle channel for each of the plurality of annotated focused images.

10. The system according to claim 1, the system further caused to:
receive the raw digital holographic microscopy image captured via a sample capture apparatus.

11. The system according to claim 1, wherein the range of target focal lengths represents a predefined range of target focal lengths at which object representations are determined likely to be depicted in focus.

12. The system according to claim 1, wherein the first target focal length determined via the selection algorithm is at which the selected object representation is best in focus.

13. A method comprising:
at a device with one or more processors and a memory:
generating a grayscale focused image set corresponding to a raw digital holographic microscopy image comprising at least one captured object representation, each grayscale focused image in the grayscale focused image set focused at a different target focal length of a range of target focal lengths;
generating at least one object identification data by comparing the grayscale focused image set to a plurality of annotated focused images associated with a training raw digital holographic microscopy image, each of the plurality of annotated focused images comprising a plurality of channels, wherein the plurality of channels for each annotated focused image of the plurality of annotated focused images comprises:
a middle channel comprising a first grayscale focused image corresponding to a first target focal length of the range of target focal lengths, the first target focal length at which a selected object representation within at least the training raw digital holographic microscopy image is determined via a selection algorithm;
a shorter channel comprising a second grayscale focused image corresponding to a second target focal length of the range of target focal lengths, wherein the second target focal length is shorter than the first target focal length; and
a longer channel comprising a third grayscale focused image corresponding to a third target focal length of the range of target focal lengths, wherein the third target focal length is longer than the first target focal length,
wherein each particular annotated focused image of the plurality of annotated focused images is associated with annotation data that identifies one or more object representations in each channel of the particular annotated focused image; and
outputting the at least one object identification data.

14. The method according to claim 13, wherein generating the grayscale focused image set comprises applying a spectral propagation algorithm to the raw digital holographic microscopy image over the range of target focal lengths.

15. The method according to claim 13, wherein generating the at least one object identification data comprises:
processing the grayscale focused image set utilizing a model trained based on the plurality of annotated focused images associated with at least the training raw digital holographic microscopy image.

16. The method according to claim 15, the method further comprising:
training the model based at least in part on the plurality of annotated focused images.

17. The method according to claim 15, the method further comprising:
generating the plurality of annotated focused images by:
receiving a set of training grayscale focused images;
for each particular object representation of a set of object representations in the training raw digital holographic microscopy image, generating a focused image by:
assigning the middle channel of the focused image to a first training grayscale focused image of the set of training grayscale focused images corresponding to a determined first target focal length for the particular object representation of the range of target focal lengths, the determined first target focal length at which the particular object representation within at least the training raw digital holographic microscopy image is determined via the selection algorithm;
assigning the shorter channel of the focused image to a second training grayscale focused image of the set of training grayscale focused images corresponding to a determined second target focal length for the particular object representation, the determined second target focal length based at least in part on an offset from the determined first target focal length for the particular object representation in a first direction; and
assigning the longer channel of the focused image to a third training grayscale focused image of the set of training grayscale focused images corresponding to a determined third target focal length for the particular object representation, the determined third target focal length based at least in part on the offset from the determined first target focal length for the particular object representation in a second direction; and
associating the focused image with particular annotation data for the particular object representation.

18. The method according to claim 17, wherein the particular annotation data for the particular object representation indicates a boundary of the particular object representation within the focused image.

19. The method according to claim 17, the method further comprising:
generating, from the plurality of annotated focused images, a test subset of annotated focused images, a training subset of annotated focused images, and a validation subset of annotated focused images, wherein the model is trained based at least in part on the test subset of annotated focused images, the training subset of annotated focused images, and the validation subset of annotated focused images.

20. A non-transitory computer-readable storage medium comprising computer program code for execution by one or more processors of a device, the computer program code configured to, when executed by the one or more processors, cause the device to:
generate a grayscale focused image set corresponding to a raw digital holographic microscopy image comprising at least one captured object representation, each grayscale focused image in the grayscale focused image set focused at a different target focal length of a range of target focal lengths;
generate at least one object identification data by comparing the grayscale focused image set to a plurality of annotated focused images associated with a training raw digital holographic microscopy image, each of the plurality of annotated focused images comprising a plurality of channels, wherein the plurality of channels for each annotated focused image of the plurality of annotated focused images comprises:
a middle channel comprising a first grayscale focused image corresponding to a first target focal length of the range of target focal lengths, the first target focal length at which a selected object representation within at least the training raw digital holographic microscopy image is determined via a selection algorithm;

a shorter channel comprising a second grayscale focused image corresponding to a second target focal length of the range of target focal lengths, wherein the second target focal length is shorter than the first target focal length; and a longer channel comprising a third grayscale focused image corresponding to a third target focal length of the range of target focal lengths, wherein the third target focal length is longer than the first target focal length, wherein each particular annotated focused image of the plurality of annotated focused images is associated with annotation data that identifies one or more object representations in each channel of the particular annotated focused image; and output the at least one object identification data.

* * * * *